(12) United States Patent
Huang

(10) Patent No.: US 11,994,748 B2
(45) Date of Patent: May 28, 2024

(54) OPTICAL IMAGING LENS ASSEMBLY, IMAGE CAPTURING UNIT AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/204,875

(22) Filed: Jun. 1, 2023

(65) Prior Publication Data
US 2023/0305269 A1    Sep. 28, 2023

Related U.S. Application Data

(63) Continuation of application No. 17/140,918, filed on Jan. 4, 2021, now Pat. No. 11,709,338, which is a (Continued)

(30) Foreign Application Priority Data

Feb. 22, 2018   (TW) .................................. 107105878

(51) Int. Cl.
*G02B 9/64*       (2006.01)
*G02B 13/00*     (2006.01)
(Continued)

(52) U.S. Cl.
CPC ........... *G02B 9/64* (2013.01); *G02B 13/0045* (2013.01); *G02B 27/0037* (2013.01); *G02B 27/646* (2013.01); *H04N 23/55* (2023.01)

(58) Field of Classification Search
CPC .. G02B 9/64; G02B 13/0045; G02B 27/0037; G02B 27/646; H04N 23/55
(Continued)

(56) References Cited

U.S. PATENT DOCUMENTS 2,502,543 A    4/1950  Warmisham
3,174,396 A    3/1965  Ruben
(Continued)

FOREIGN PATENT DOCUMENTS

CN    101408664 A    4/2009
CN    204241748 U    4/2015
(Continued)

OTHER PUBLICATIONS

TW Office Action dated Jun. 25, 2018 as received in Application No. 107105878.

*Primary Examiner* — Wyatt A Stoffa
*Assistant Examiner* — Mitchell T Oestreich
(74) *Attorney, Agent, or Firm* — Maschoff Brennan

(57) ABSTRACT

An optical imaging lens assembly includes seven lens elements which are, in order from an object side to an image side: a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The object-side surface of the first lens element is convex in a paraxial region thereof, and at least one surface among the object-side surfaces and the image-side surfaces of the seven lens elements has at least one inflection point.

20 Claims, 24 Drawing Sheets

Related U.S. Application Data continuation of application No. 16/051,437, filed on Jul. 31, 2018, now Pat. No. 10,914,919.

(51) Int. Cl.
| | | |
|---|---|---|
| *G02B 27/00* | (2006.01) | |
| *G02B 27/64* | (2006.01) | |
| *H04N 23/55* | (2023.01) | |

(58) Field of Classification Search
USPC .......................................... 359/755
See application file for complete search history.

(56) References Cited

U.S. PATENT DOCUMENTS

| | | |
|---|---|---|
| 4,099,843 A | 7/1978 | Imai |
| 4,212,515 A | 7/1980 | Itaya |
| 4,322,136 A | 3/1982 | Nagano |
| 4,523,817 A | 6/1985 | Kikuchi |
| 4,624,535 A | 11/1986 | Kurihara et al. |
| 4,963,007 A | 10/1990 | Moskovich |
| 4,976,525 A | 12/1990 | Matsumura et al. |
| 5,066,113 A | 11/1991 | Nakajima et al. |
| 5,930,043 A | 7/1999 | Ogawa |
| 9,063,318 B2 | 6/2015 | Ishizaka |
| 9,678,305 B2 | 6/2017 | Sakai |
| 9,841,608 B2 | 12/2017 | Sakai |
| 9,874,725 B2 | 1/2018 | Lai et al. |
| 10,114,196 B2 | 10/2018 | Dai et al. |
| 10,139,598 B1 | 11/2018 | Wang et al. |
| 10,324,272 B2 | 6/2019 | Huang |
| 10,382,891 B2 | 8/2019 | Tsuda et al. |
| 10,394,002 B2 | 8/2019 | Huang |
| 10,598,893 B2 | 3/2020 | Zhang et al. |
| 10,838,172 B2 | 11/2020 | Kang et al. |
| 2010/0166413 A1 | 7/2010 | Hirao et al. |
| 2010/0188555 A1 | 7/2010 | Hirao et al. |
| 2010/0321794 A1 | 12/2010 | Hirao et al. |
| 2011/0001865 A1 | 1/2011 | Hirao et al. |
| 2012/0162787 A1 | 6/2012 | Adachi et al. |
| 2013/0293767 A1 | 11/2013 | Imaoka et al. |
| 2014/0009843 A1 | 1/2014 | Tsai et al. |
| 2014/0049845 A1 | 2/2014 | Adachi et al. |
| 2014/0139719 A1* | 5/2014 | Fukaya ............... G02B 27/0025 348/340 |
| 2015/0070783 A1 | 3/2015 | Hashimoto |
| 2015/0247989 A1 | 9/2015 | Sakai |
| 2015/0248016 A1 | 9/2015 | Sakai |
| 2015/0378131 A1 | 12/2015 | Tang et al. |
| 2016/0131874 A1 | 5/2016 | Tang et al. |
| 2016/0282587 A1 | 9/2016 | Hashimoto |
| 2016/0299319 A1 | 10/2016 | Tang et al. |
| 2017/0059825 A1 | 3/2017 | Tang et al. |
| 2017/0059826 A1 | 3/2017 | Tang et al. |
| 2017/0082834 A1 | 3/2017 | Tang et al. |
| 2017/0082835 A1 | 3/2017 | Tang et al. |
| 2017/0090157 A1 | 3/2017 | Tang et al. |
| 2017/0090158 A1 | 3/2017 | Tang et al. |
| 2017/0168267 A1 | 6/2017 | Tang et al. |
| 2017/0168268 A1 | 6/2017 | Tang et al. |
| 2017/0285304 A1 | 10/2017 | Lai et al. |
| 2017/0285305 A1 | 10/2017 | Lai et al. |
| 2017/0336605 A1 | 11/2017 | Lai et al. |
| 2017/0336606 A1 | 11/2017 | Lai et al. |
| 2018/0074298 A1 | 3/2018 | Jung et al. |
| 2018/0149837 A1 | 5/2018 | Jung |
| 2018/0188483 A1 | 7/2018 | Hsieh et al. |
| 2018/0188484 A1 | 7/2018 | Gong et al. |
| 2018/0188487 A1 | 7/2018 | Hsieh et al. |
| 2018/0196226 A1 | 7/2018 | Chang et al. |
| 2018/0196235 A1 | 7/2018 | Chang et al. |
| 2018/0335608 A1 | 11/2018 | Chang et al. |
| 2018/0335609 A1 | 11/2018 | Chang et al. |
| 2019/0121083 A1 | 4/2019 | Bian et al. |
| 2019/0137736 A1 | 5/2019 | Huh et al. |
| 2019/0146185 A1 | 5/2019 | Chen et al. |
| 2019/0146188 A1 | 5/2019 | Lyu et al. |
| 2019/0146189 A1 | 5/2019 | Lyu |
| 2019/0154972 A1 | 5/2019 | Zhang et al. |
| 2019/0154973 A1 | 5/2019 | Zhang et al. |
| 2019/0187414 A1 | 6/2019 | Zhang |
| 2019/0204540 A1 | 7/2019 | Liao et al. |
| 2019/0204553 A1 | 7/2019 | Lian et al. |
| 2019/0204565 A1 | 7/2019 | Wolterink et al. |
| 2019/0243106 A1 | 8/2019 | Xu et al. |
| 2020/0233188 A1 | 7/2020 | Lyu et al. |
| 2021/0278634 A1 | 9/2021 | Hu et al. |

FOREIGN PATENT DOCUMENTS

| | | |
|---|---|---|
| CN | 204314533 U | 5/2015 |
| CN | 106842512 A | 6/2017 |
| CN | 107300751 A | 10/2017 |
| CN | 107402436 A | 11/2017 |
| CN | 107479172 A | 12/2017 |
| CN | 107678132 A | 2/2018 |
| CN | 107797229 A | 3/2018 |
| CN | 107797236 A | 3/2018 |
| CN | 107942493 A | 4/2018 |
| CN | 107957619 A | 4/2018 |
| CN | 108107552 A | 6/2018 |
| JP | S58-86510 A | 5/1983 |
| JP | S63-155102 A | 6/1988 |
| JP | H01-188814 A | 7/1989 |
| JP | H05-93855 A | 4/1993 |
| JP | H07-318803 A | 12/1995 |
| JP | H10-39236 A | 2/1998 |
| JP | H10-170818 A | 6/1998 |
| JP | 2008-032921 A | 2/2008 |
| JP | 2009-251367 A | 10/2009 |
| JP | 2013-130723 A | 7/2013 |
| JP | 2014-145961 A | 8/2014 |
| JP | 2015-114505 A | 6/2015 |
| JP | 2015-163926 A | 9/2015 |
| JP | 2015-163927 A | 9/2015 |
| JP | 2015-163928 A | 9/2015 |
| JP | 2015-225102 A | 12/2015 |
| JP | 2016-126086 A | 7/2016 |
| JP | 2017-012287 A | 1/2017 |
| JP | 2017-049572 A | 3/2017 |
| TW | 201606342 A | 2/2016 |
| TW | I595261 B | 8/2017 |
| WO | 2016/109938 A1 | 7/2016 |
| WO | 2017/078255 A1 | 5/2017 |
| WO | 2018/224025 A1 | 12/2018 |

\* cited by examiner

OPTICAL IMAGING LENS ASSEMBLY, IMAGE CAPTURING UNIT AND ELECTRONIC DEVICE

RELATED APPLICATIONS

This application is a continuation patent application of U.S. application Ser. No. 17/140,918, filed on Jan. 4, 2021, which is a continuation patent application of U.S. application Ser. No. 16/051,437, filed on Jul. 31, 2018, which claims priority to Taiwan Application 107105878, filed on Feb. 22, 2018, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality has been one of the indispensable features of an optical system nowadays.

Furthermore, due to the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, desirable size of the aperture, miniaturization or required field of view. Accordingly, the present disclosure provides an optical system satisfying the aforementioned requirements.

SUMMARY

According to one aspect of the present disclosure, an optical imaging lens assembly includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The object-side surface of the first lens element is convex in a paraxial region thereof. At least one surface among the object-side surfaces and the image-side surfaces of the seven lens elements has at least one inflection point. When an entrance pupil diameter of the optical imaging lens assembly is EPD, a sum of central thicknesses of the seven lens elements of the optical imaging lens assembly is $\Sigma CT$, a central thickness of the first lens element is $CT1$, a curvature radius of the object-side surface of the first lens element is $R1$, and a focal length of the optical imaging lens assembly is f, the following conditions are satisfied:

$1.45 < EPD/(\Sigma CT - CT1) < 5.0$;

$0.50 < R1/CT1 < 3.50$; and $2.20 < f/R1 < 5.0$.

According to another aspect of the present disclosure, an image capturing unit includes the aforementioned optical imaging lens assembly and an image sensor, wherein the image sensor is disposed on an image surface of the optical imaging lens assembly.

According to still another aspect of the present disclosure, an electronic device includes the aforementioned image capturing unit.

According to yet another aspect of the present disclosure, an optical imaging lens assembly includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side. At least one surface among the object-side surfaces and the image-side surfaces of the seven lens elements has at least one inflection point. Each of at least three of the seven lens elements has an Abbe number smaller than 26.0. When an entrance pupil diameter of the optical imaging lens assembly is EPD, a sum of central thicknesses of the seven lens elements of the optical imaging lens assembly is $\Sigma CT$, a central thickness of the first lens element is $CT1$, an axial distance between the object-side surface of the first lens element and an image surface is TL, and a focal length of the optical imaging lens assembly is f, the following conditions are satisfied:

$1.45 < EPD/(\Sigma CT - CT1) < 5.0$; and $0.50 < TL/f < 1.80$.

According to yet still another aspect of the present disclosure, an optical imaging lens assembly includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side. At least one surface among the object-side surfaces and the image-side surfaces of the seven lens elements has at least one inflection point. Each of at least four of the seven lens elements has an Abbe number smaller than 40.0. The first lens element has positive refractive power. When an entrance pupil diameter of the optical imaging lens assembly is EPD, a sum of central thicknesses of the seven lens elements of the optical imaging lens assembly is $\Sigma CT$, a central thickness of the first lens element is $CT1$, an axial distance between the object-side surface of the first lens element and an image surface is TL, a focal length of the optical imaging lens assembly is f, and half of a maximum field of view of the optical imaging lens assembly is HFOV, the following conditions are satisfied:

$0.50 < EPD/(\Sigma CT - CT1) < 8.0$;

$0.50 < TL/f < 1.50$;

$1.0 < f/EPD < 1.90$; and $0.14 < \tan(HFOV) < 0.53$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
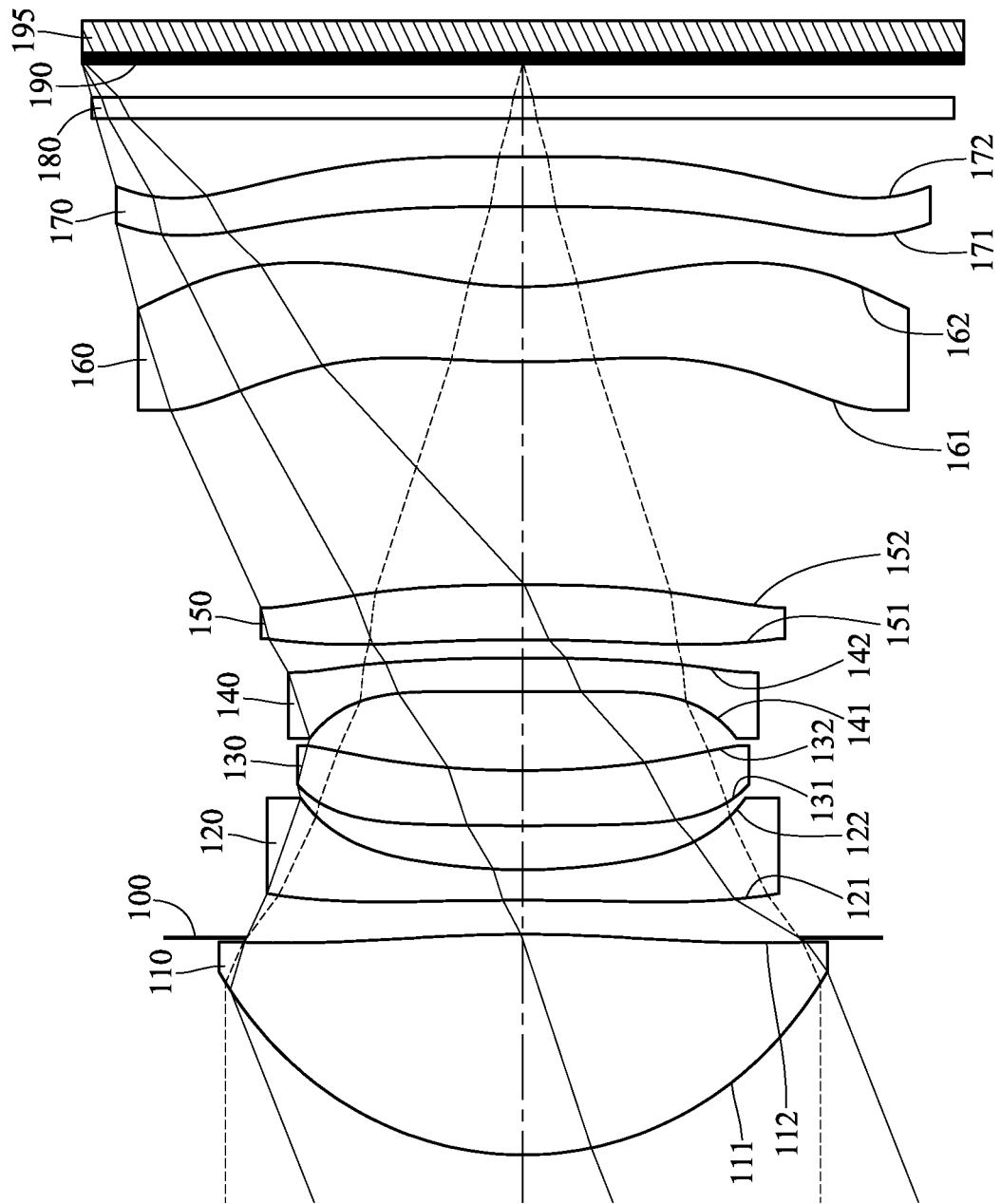
FIG. 1 is a schematic view of an image capturing unit according to the 1st embodiment of the present disclosure.

An optical imaging lens assembly includes seven lens elements. The seven lens elements are, in order from an object side to an image side, a first lens element, a second lens element, a third lens element, a fourth lens element, a fifth lens element, a sixth lens element and a seventh lens element.

The first lens element can have positive refractive power; therefore, it is favorable for providing sufficient light convergence capability so as to reduce a total track length of the optical imaging lens assembly. The first lens element can have an object-side surface being convex in a paraxial region thereof; therefore, it is favorable for enhancing light convergence capability on the object side so as to obtain better telephoto effect and provide sufficient incident light in an optical system having large aperture stop.

The second lens element can have negative refractive power; therefore, it is favorable for preventing image overlaps due to light rays with different wavelengths focusing on different positions. The second lens element can have an object-side surface being convex in a paraxial region thereof and an image-side surface being concave in a paraxial region thereof; therefore, it is favorable for light converging in both a tangential direction and a sagittal direction so as to correct astigmatism.

The sixth lens element can have an image-side surface being concave in a paraxial region thereof. Therefore, it is favorable for reducing a back focal length of the optical imaging lens assembly so as to achieve miniaturization.

Among all object-side surfaces and all image-side surfaces of the seven lens elements (the first lens element through the seventh lens element), at least one surface has at least one inflection point; therefore, it is favorable for correcting peripheral aberrations and reducing the total track length so as to achieve high image quality and compactness. Preferably, at least one surface of at least one lens element among the fifth lens element, the sixth lens element and the seventh lens element has at least one inflection point; therefore, it is favorable for correcting off-axis aberrations so as to flatten Petzval surface. Or preferably, at least one surface of at least one lens element among the seven lens elements has at least three inflection points; therefore, it is favorable for enhancing the capability of correcting off-axis aberrations so as to further reduce the total track length as well as eliminate coma and distortion.

Among the seven lens elements (the first lens element through the seventh lens element), each of at least four lens elements can have an Abbe number smaller than 40.0. Therefore, it is favorable for controlling the light path so as to balance axial chromatic aberration, thereby improving image quality. Preferably, each of at least four lens elements among the seven lens elements can have an Abbe number smaller than 30.0. More preferably, each of at least four lens elements among the seven lens elements can have an Abbe number smaller than 25.0.

Among the seven lens elements (the first lens element through the seventh lens element), each of at least three lens elements can have an Abbe number smaller than 30.0. Therefore, it is favorable for controlling the light path so as to balance axial chromatic aberration, thereby improving image quality. Preferably, each of at least three lens elements among the seven lens elements can have an Abbe number smaller than 26.0. More preferably, each of at least three lens elements among the seven lens elements can have an Abbe number smaller than 25.0. Much more preferably, each of at least three lens elements among the seven lens elements can have an Abbe number smaller than 20.0.

Among the seven lens elements (the first lens element through the seventh lens element), each of at least two lens elements can have an Abbe number smaller than 20.0. Therefore, it is favorable for controlling the light path so as to balance axial chromatic aberration, thereby improving image quality.

When an entrance pupil diameter of the optical imaging lens assembly is EPD, a sum of central thicknesses of the seven lens elements of the optical imaging lens assembly is ΣCT, and a central thickness of the first lens element is CT1, the following condition is satisfied: $0.50<EPD/(\Sigma CT-CT1)<8.0$. Therefore, it is favorable for obtaining proper aperture size and a sufficient amount space for lens elements so as to improve the light receiving capability of the optical imaging lens assembly, thereby enhancing image brightness. Preferably, the following condition can be satisfied: $1.45<EPD/(\Sigma CT-CT1)<5.0$. More preferably, the following condition can also be satisfied: $1.55<EPD/(\Sigma CT-CT1)<4.0$.

When a curvature radius of the object-side surface of the first lens element is R1, and the central thickness of the first lens element is CT1, the following condition can be satisfied: $0.50<R1/CT1<3.50$. Therefore, it is favorable for the object-side surface of the first lens element having larger curvature so as to satisfy the need of telephoto shots within limited space. Preferably, the following condition can also be satisfied: $0.70<R1/CT1<2.80$.

When a focal length of the optical imaging lens assembly is f, and the curvature radius of the object-side surface of the first lens element is R1, the following condition can be satisfied: $1.50<f/R1<8.0$. Therefore, it is favorable for obtaining a telephoto setup as well as maintaining the total track length so as to achieve miniaturization. Preferably, the following condition can be satisfied: $2.20<f/R1<5.0$. More preferably, the following condition can also be satisfied: $2.80<f/R1<4.0$.

When an axial distance between the object-side surface of the first lens element and an image surface is TL, and the focal length of the optical imaging lens assembly is f, the following condition can be satisfied: $0.50<TL/f<1.80$. Therefore, it is favorable for improving the resolution of a magnified image and controlling the total track length. Preferably, the following condition can be satisfied: $0.50<TL/f<1.50$. More preferably, the following condition can also be satisfied: $0.60<TL/f<1.05$.

When the focal length of the optical imaging lens assembly is f, and the entrance pupil diameter of the optical imaging lens assembly is EPD, the following condition can be satisfied: $1.0<f/EPD<2.20$. Therefore, it is favorable for adjusting the size of aperture stop so as to control the amount of incident light, thereby further enhancing image brightness. Preferably, the following condition can be satisfied: $1.0<f/EPD<1.90$. More preferably, the following condition can be satisfied: $1.20<f/EPD<1.80$. Much more preferably, the following condition can also be satisfied: $1.25<f/EPD<1.60$.

When half of a maximum field of view of the optical imaging lens assembly is HFOV, the following condition can be satisfied: $0.14<\tan(HFOV)<0.53$. Therefore, it is favorable for adjusting an effective imaging range and improving the resolution of a magnified image from a telephoto shot.

When the axial distance between the object-side surface of the first lens element and the image surface is TL, and a maximum image height of the optical imaging lens assembly (half of a diagonal length of an effective photosensitive area of an image sensor) is ImgH, the following condition can be satisfied: $1.20<TL/ImgH<2.80$. Therefore, it is favorable for balancing between compactness and a sufficient light receiving area to maintain proper image brightness.

When an Abbe number of the seventh lens element is V7, the following condition can be satisfied: $V7<30.0$. Therefore, due to a larger density difference between a high-dispersion material (low Abbe number) and air, it is favorable for the seventh lens element obtaining stronger refractive capability, such that light is properly refracted within a shorter distance. Preferably, the following condition can also be satisfied: $10.0<V7<23.0$.

When an axial distance between the second lens element and the third lens element is T23, and an axial distance between the third lens element and the fourth lens element is T34, the following condition can be satisfied: $0.05<T23/T34<1.0$. Therefore, the axial distance between two adjacent lens elements is properly arranged so as to be favorable for lens assembling while reducing sensitivity. Preferably, the following condition can be satisfied: $0.20<T23/T34<1.0$. More preferably, the following condition can also be satisfied: $0.30<T23/T34<0.80$.

Figure 23:
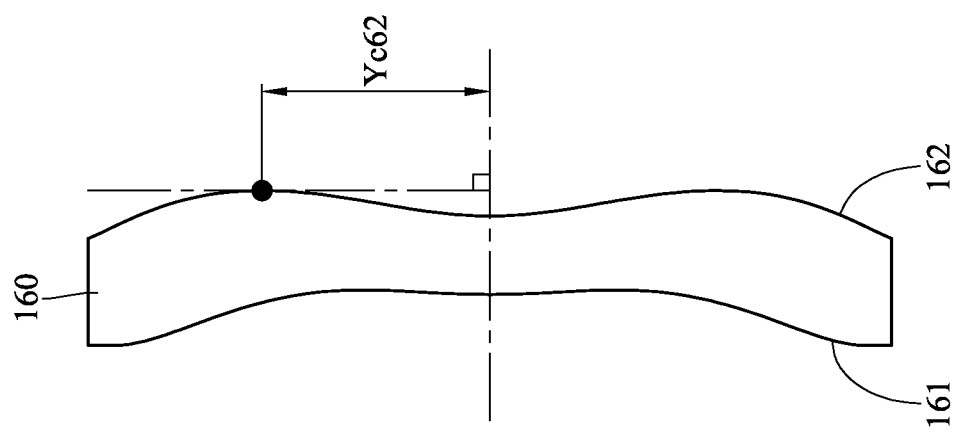
FIG. 23 shows a schematic view of Yc62 according to the 1st embodiment of the present disclosure.

When a vertical distance between a critical point on the image-side surface of the sixth lens element and an optical axis is Yc62, and a central thickness of the sixth lens element is CT6, the following condition can be satisfied: $0.30<Yc62/CT6<7.50$. Therefore, it is favorable for correcting off-axis aberrations and reducing the field curvature of the image surface. A schematic view of Yc62 according to the 1st embodiment of the present disclosure is shown in FIG. 23.

When a curvature radius of an object-side surface of the seventh lens element is R13, and a curvature radius of an image-side surface of the seventh lens element is R14, the following condition can be satisfied: $-1.80<(R13-R14)/(R13+R14)<0.50$. Therefore, it is favorable for effectively controlling the shape of the lens element close to the image surface so as to obtain telephoto effect and improve symmetry of the optical imaging lens assembly.

When the axial distance between the object-side surface of the first lens element and the image surface is TL, and the entrance pupil diameter of the optical imaging lens assembly is EPD, the following condition can be satisfied: $1.25<TL/EPD<2.0$. Therefore, it is favorable for balancing between a large aperture and a shorter total track length, thereby meeting the specification of a compact lens system with a large aperture.

When the focal length of the optical imaging lens assembly is f, and a curvature radius of the image-side surface of the sixth lens element is R12, the following condition can be satisfied: $2.50<f/R12<6.50$. Therefore, it is favorable for reducing the back focal length of the optical imaging lens assembly so as maintain a compact size thereof, and thus the optical imaging lens assembly is applicable to various applications.

When an axial distance between the image-side surface of the seventh lens element and the image surface is BL, and an axial distance between the object-side surface of the first lens element and the image-side surface of the seventh lens element is TD, the following condition can be satisfied: $0<BL/TD<0.35$. Therefore, a ratio of the back focal length to a height of the optical imaging lens assembly is proper for miniaturizing the optical imaging lens assembly so as to achieve compactness. Preferably, the following condition can also be satisfied: $0.05<BL/TD<0.20$.

When the focal length of the optical imaging lens assembly is f, and the maximum image height of the optical imaging lens assembly is ImgH, the following condition can be satisfied: $1.90<f/ImgH<3.50$. Therefore, it is favorable for adjusting the effective imaging range and the field of view so as to enhance the resolution of a magnified image, thereby obtaining better image quality in telephoto shots.

The optical imaging lens assembly further includes an aperture stop. When an axial distance between the aperture stop and the image-side surface of the seventh lens element is SD, and the axial distance between the object-side surface of the first lens element and the image-side surface of the seventh lens element is TD, the following condition can be satisfied: $0.70<SD/TD<0.90$. Therefore, it is favorable for properly positioning the aperture stop so as to control the size of the optical imaging lens assembly, thereby preventing the electronic device equipped with the optical imaging lens assembly from overly large.

When the focal length of the optical imaging lens assembly is f, and the curvature radius of the image-side surface of the seventh lens element is R14, the following condition can be satisfied: $|f/R14|<0.50$. Therefore, it is favorable for adjusting the shape of the lens element on the image side of the optical imaging lens assembly so as to reduce the incident angle on the image surface, thereby preventing insufficient brightness in the peripheral region of the image. Preferably, the following condition can be satisfied: $|f/R14|<0.35$. More preferably, the following condition can be satisfied: $|f/R14|<0.25$. Much more preferably, the following condition can also be satisfied: $|f/R14|<0.15$.

When the focal length of the optical imaging lens assembly is f, the axial distance between the object-side surface of the first lens element and the image surface is TL, the entrance pupil diameter of the optical imaging lens assembly is EPD, and the maximum image height of the optical imaging lens assembly is ImgH, the following condition can be satisfied: $2.0<(f\times TL)/(EPD\times ImgH)<5.20$. Therefore, the arrangement of optical parameters in both an axial direction and a radial direction is balanced so that it is favorable for improving the symmetry of the optical imaging lens assembly so as to reduce sensitivity; also, it is favorable for improving the photographing performance so as to allow utilizations in various technical fields. Preferably, the following condition can also be satisfied: $3.0<(f\times TL)/(EPD\times ImgH)<5.0$.

When the curvature radius of the object-side surface of the first lens element is R1, the focal length of the optical imaging lens assembly is f, and the central thickness of the first lens element is CT1, the following condition can be satisfied: $0.05<(R1\times R1)/(f\times CT1)<0.85$. Therefore, it is favorable for enhancing the relationship between the curvature of the object-side surface of the first lens element and the central thickness of the first lens element, so as to obtain telephoto functionality.

Figure 24:
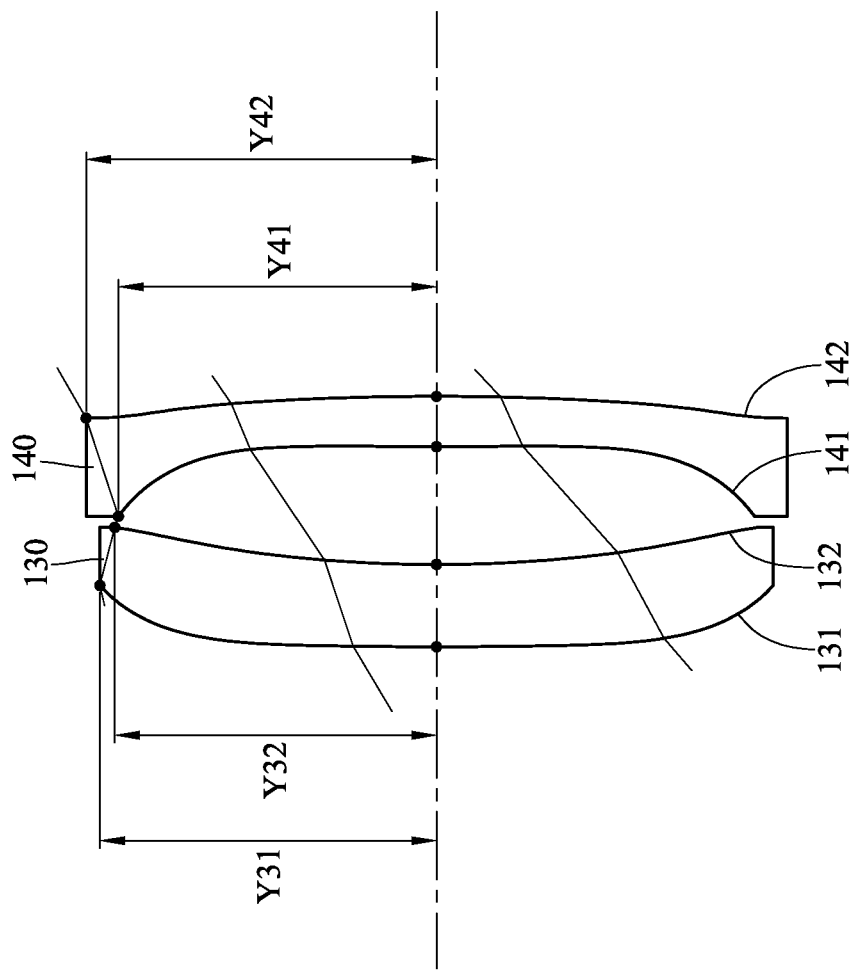
FIG. 24 shows a schematic view of Y31, Y32, Y41 and Y42 according to the 1st embodiment of the present disclosure.

According to the present disclosure, a minimum value among all maximum effective radii of the object-side surfaces and the image-side surfaces of the seven lens elements is Ymin. A maximum effective radius of at least one surface among the object-side surface of the third lens element, the image-side surface of the third lens element, the object-side surface of the fourth lens element and the image-side surface of the fourth lens element can be Ymin. Therefore, it is favorable for adjusting the size of lens elements so as to obtain a proper ratio of a light receiving area to an imaging area; also, it is favorable for improving the symmetry of the optical imaging lens assembly so as to reduce sensitivity. A schematic view of Y31, Y32, Y41 and Y42 according to the 1st embodiment of the present disclosure is shown in FIG. 24, wherein a maximum effective radius of an object-side surface of the third lens element is Y31, a maximum effective radius of an image-side surface of the third lens element is Y32, a maximum effective radius of an object-side surface of the fourth lens element is Y41, and a maximum effective radius of an image-side surface of the fourth lens element is Y42. At least one of the parameters Y31, Y32, Y41 and Y42 is Ymin.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, the Abbe number of the seventh lens element is V7, and an Abbe number of the i-th lens element is Vi, the following condition can be satisfied: $50.0<\Sigma Vi<300.0$, wherein i=1~7. Therefore, it is favorable for strengthening the refractive power of the optical imaging lens assembly so as to meet the requirements of high specification. Preferably, the following condition can also be satisfied: $80.0<\Sigma Vi<250.0$.

When the axial distance between the object-side surface of the first lens element and the image surface is TL, the entrance pupil diameter of the optical imaging lens assembly is EPD, and an axial distance between the fifth lens element and the sixth lens element is T56, the following condition can be satisfied: $0.80<TL/(EPD+T56)<1.80$. Therefore, it is favorable for obtaining the proper axial distance between the fifth lens element and the sixth lens element with a proper sized aperture so as to achieve miniaturization with a long focal length.

When an Abbe number of at least one lens element having positive refractive power among the seven lens elements (the first lens element through the seventh lens element) is Vp, the following condition can be satisfied: $Vp<25.0$. Therefore, it is favorable for controlling the light dispersion for various imaging ranges. Preferably, the following condition can also be satisfied: $Vp<23.0$.

When the focal length of the optical imaging lens assembly is f, and a focal length of the second lens element is f2, the following condition can be satisfied: $-3.0<f/f2<0.35$. Therefore, the refractive power of the second lens element is favorable for correcting aberrations generated by the first lens element so as to eliminate spherical aberration, thereby improving image quality.

When the central thickness of the first lens element is CT1, and a central thickness of the seventh lens element is CT7, the following condition can be satisfied: $1.70<CT1/CT7$. Therefore, it is favorable for balancing the central thickness of the lens element on the object side and the central thickness of the lens element on the image side, so as to strengthen light convergence capability on the object side while improving aberration corrections on the image side.

When the focal length of the optical imaging lens assembly is f, and a focal length of the seventh lens element is f7, the following condition can be satisfied: $-2.50<f/f7<0.90$. Therefore, the refractive power of the seventh lens element is favorable for correcting aberrations so as to improve image quality. Preferably, the following condition can be satisfied: $-2.50<f/f7<0.15$. More preferably, the following condition can also be satisfied: $-2.50<f/f7<0.10$.

When the axial distance between the fifth lens element and the sixth lens element is T56, and a sum of axial distances between every adjacent lens elements of the optical imaging lens assembly is EAT, the following condition can be satisfied: $0.15<T56/(EAT-T56)<3.0$. Therefore, it is favorable for controlling the light rays between the fifth lens element and the sixth lens element so as to obtain telephoto effect.

When an axial distance between the sixth lens element and the seventh lens element is T67, and the central thickness of the sixth lens element is CT6, the following condition can be satisfied: $0.30<T67/CT6<4.0$. Therefore, it is favorable for providing better space utilization on the image side of the optical imaging lens assembly so as to reduce sensitivity and increase functionality. Preferably, the following condition can also be satisfied: $0.85<T67/CT6<4.0$.

According to the present disclosure, the axial distance between the fifth lens element and the sixth lens element can be maximum among the axial distances between each of the adjacent seven lens elements of the optical imaging lens assembly. That is, the axial distance between the fifth lens element and the sixth lens element can be larger than an axial distance between the first lens element and the second lens element, the axial distance between the second lens element and the third lens element, the axial distance between the third lens element and the fourth lens element, an axial distance between the fourth lens element and the fifth lens element and the axial distance between the sixth lens element and the seventh lens element. Therefore, it is favorable for obtaining a sufficiently large gap between the fifth lens element and the sixth lens element so as to correct aberrations.

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows for more controllable variables for eliminating the aberration thereof, the required number of the lens elements can be reduced, and the total track length of the optical imaging lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on a surface of the lens element at which the surface changes from concave to convex, or vice versa. A critical point is a non-axial point of the lens surface where its tangent is perpendicular to the optical axis.

According to the present disclosure, an image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the optical imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the above description of the present disclosure, the following specific embodiments are provided for further explanation.

1st Embodiment

Figure 2:
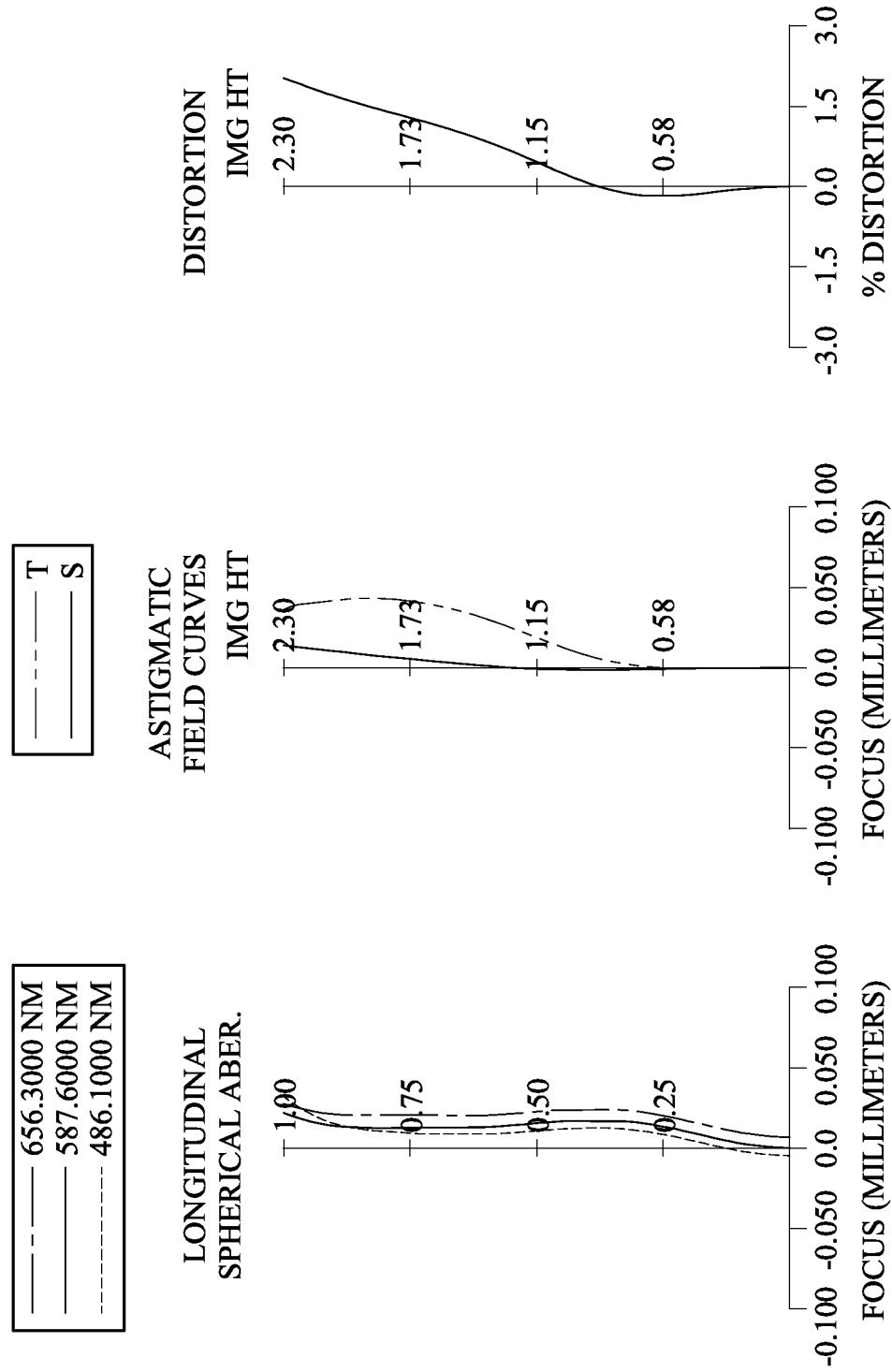
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 195. The optical imaging lens assembly includes, in order from an object side to an image side, a first lens element 110, an aperture stop 100, a second lens element 120, a third lens element 130, a fourth lens element 140, a fifth lens element 150, a sixth lens element 160, a seventh lens element 170, a filter 180 and an image surface 190. The optical imaging lens assembly includes seven lens elements (110, 120, 130, 140, 150, 160 and 170) with no additional lens element disposed between each of the adjacent seven lens elements.

The first lens element 110 with positive refractive power has an object-side surface 111 being convex in a paraxial region thereof and an image-side surface 112 being convex in a paraxial region thereof. The first lens element 110 is made of glass material and has the object-side surface 111 and the image-side surface 112 being both aspheric. The image-side surface 112 of the first lens element 110 has one inflection point.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has one inflection point.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The image-side surface 132 of the third lens element 130 has one inflection point.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has one inflection point. The image-side surface 142 of the fourth lens element 140 has two inflection points.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. Each of the object-side surface 151 and the image-side surface 152 of the fifth lens element 150 has one inflection point.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. Each of the object-side surface 161 and the image-side surface 162 of the sixth lens element 160 has two inflection points. The image-side surface 162 of the sixth lens element 160 has at least one critical point.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. Each of the object-side surface 171 and the image-side surface 172 of the seventh lens element 170 has two inflection points.

The filter 180 is made of glass material and located between the seventh lens element 170 and the image surface 190, and will not affect the focal length of the optical imaging lens assembly. The image sensor 195 is disposed on or near the image surface 190 of the optical imaging lens assembly.

Among the first lens element 110 through the seventh lens element 170, three lens elements (the first lens element 110, the fourth lens element 140 and the fifth lens element 150) have positive refractive power. When an Abbe number of each of these three lens elements having positive refractive power is Vp, the following condition is satisfied for two (the fourth lens element 140 and the fifth lens element 150) of these three lens elements: Vp<25.0.

In this embodiment, the number of inflection point on a surface is determined by the change of the sign of curvature radius from the paraxial region to the peripheral region.

When a minimum value among all maximum effective radii of the object-side surfaces (111, 121, 131, 141, 151, 161, 171) and the image-side surfaces (112, 122, 132, 142, 152, 162, 172) of the seven lens elements is Ymin, a maximum effective radius of the object-side surface 141 of the fourth lens element 140 is equal to Ymin.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
X is the relative distance between a point on the aspheric surface spaced at a distance Y from an optical axis and the tangential plane at the aspheric surface vertex on the optical axis;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14 and 16.

In the optical imaging lens assembly of the image capturing unit according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=5.70 millimeters (mm), Fno=1.835, HFOV=21.5 degrees (deg.).

When an Abbe number of the seventh lens element 170 is V7, the following condition is satisfied: V7=19.5.

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, the Abbe number of the seventh lens element 170 is V7, and an Abbe number of the i-th lens element is Vi, the following condition is satisfied: ΣVi=238.9, wherein i=1~7.

When a curvature radius of the object-side surface 111 of the first lens element 110 is R1, and a central thickness of the first lens element 110 is CT1, the following condition is satisfied: R1/CT1=1.50.

When the central thickness of the first lens element 110 is CT1, and a central thickness of the seventh lens element 170 is CT7, the following condition is satisfied: CT1/CT7=4.40.

When an axial distance between the sixth lens element 160 and the seventh lens element 170 is T67, and a central thickness of the sixth lens element 160 is CT6, the following condition is satisfied: T67/CT6=1.06. In this embodiment, an axial distance between two adjacent lens elements is an air gap in a paraxial region between the two adjacent lens elements.

When an axial distance between the second lens element 120 and the third lens element 130 is T23, and an axial distance between the third lens element 130 and the fourth lens element 140 is T34, the following condition is satisfied: T23/T34=0.56.

When the focal length of the optical imaging lens assembly is f, and the curvature radius of the object-side surface 111 of the first lens element 110 is R1, the following condition is satisfied: f/R1=3.29.

When the focal length of the optical imaging lens assembly is f, and a curvature radius of the image-side surface 162 of the sixth lens element 160 is R12, the following condition is satisfied: f/R12=2.93.

When the focal length of the optical imaging lens assembly is f, and a curvature radius of the image-side surface 172 of the seventh lens element 170 is R14, the following condition is satisfied: |f/R14|=0.19.

When a curvature radius of the object-side surface 171 of the seventh lens element 170 is R13, and the curvature radius of the image-side surface 172 of the seventh lens element 170 is R14, the following condition is satisfied: (R13−R14)/(R13+R14)=0.29.

When the focal length of the optical imaging lens assembly is f, and a focal length of the second lens element 120 is f2, the following condition is satisfied: f/f2=−1.26.

When the focal length of the optical imaging lens assembly is f, and a focal length of the seventh lens element 170 is f7, the following condition is satisfied: f/f7=−0.06.

When an axial distance between the aperture stop 100 and the image-side surface 172 of the seventh lens element 170 is SD, and an axial distance between the object-side surface 111 of the first lens element 110 and the image-side surface 172 of the seventh lens element 170 is TD, the following condition is satisfied: SD/TD=0.78.

When an axial distance between the object-side surface 111 of the first lens element 110 and the image surface 190 is TL, and the focal length of the optical imaging lens assembly is f, the following condition is satisfied: TL/f=1.00.

When the axial distance between the object-side surface 111 of the first lens element 110 and the image surface 190 is TL, and a maximum image height of the optical imaging lens assembly is ImgH, the following condition is satisfied: TL/ImgH=2.48.

When the focal length of the optical imaging lens assembly is f, and the maximum image height of the optical imaging lens assembly is ImgH, the following condition is satisfied: f/ImgH=2.48.

When the focal length of the optical imaging lens assembly is f, and an entrance pupil diameter of the optical imaging lens assembly is EPD, the following condition is satisfied: f/EPD=1.84.

When the axial distance between the object-side surface 111 of the first lens element 110 and the image surface 190 is TL, and the entrance pupil diameter of the optical imaging lens assembly is EPD, the following condition is satisfied: TL/EPD=1.84.

When an axial distance between the image-side surface 172 of the seventh lens element 170 and the image surface 190 is BL, and the axial distance between the object-side surface 111 of the first lens element 110 and the image-side surface 172 of the seventh lens element 170 is TD, the following condition is satisfied: BL/TD=0.09.

When half of the maximum field of view of the optical imaging lens assembly is HFOV, the following condition is satisfied: tan(HFOV)=0.39.

When a vertical distance between the critical point on the image-side surface 162 of the sixth lens element 160 and an optical axis is Yc62, and the central thickness of the sixth lens element is CT6, the following condition is satisfied: Yc62/CT6=2.90.

When the curvature radius of the object-side surface 111 of the first lens element 110 is R1, the focal length of the optical imaging lens assembly is f, and the central thickness of the first lens element 110 is CT1, the following condition is satisfied: (R1× R1)/(f×CT1)=0.46.

When an axial distance between the fifth lens element 150 and the sixth lens element 160 is T56, and a sum of axial distances between every adjacent lens elements of the optical imaging lens assembly is EAT, the following condition is satisfied: T56/(EAT-T56)=0.87.

When the axial distance between the object-side surface 111 of the first lens element 110 and the image surface 190 is TL, the entrance pupil diameter of the optical imaging lens assembly is EPD, and the axial distance between the fifth lens element 150 and the sixth lens element 160 is T56, the following condition is satisfied: TL/(EPD+T56)=1.34.

When the entrance pupil diameter of the optical imaging lens assembly is EPD, a sum of central thicknesses of the seven lens elements of the optical imaging lens assembly is ECT, and the central thickness of the first lens element 110 is CT1, the following condition is satisfied: EPD/(ECT−CT1)=1.98.

When the focal length of the optical imaging lens assembly is f, the axial distance between the object-side surface 111 of the first lens element 110 and the image surface 190 is TL, the entrance pupil diameter of the optical imaging lens assembly is EPD, and the maximum image height of the optical imaging lens assembly is ImgH, the following condition is satisfied: (f×TL)/(EPD×ImgH)=4.55.

The detailed optical data of the 1st embodiment are shown in Table 1 and the aspheric surface data are shown in Table 2 below.

TABLE 1

1st Embodiment
f = 5.70 mm, Fno = 1.835, HFOV = 21.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.733 | (ASP) | 1.153 | Glass | 1.518 | 63.5 | 2.83 |
| 2 | | −7.302 | (ASP) | −0.020 | | | | |
| 3 | Ape. Stop | Plano | | 0.197 | | | | |
| 4 | Lens 2 | −197.547 | (ASP) | 0.160 | Plastic | 1.614 | 26.0 | −4.54 |
| 5 | | 2.826 | (ASP) | 0.231 | | | | |
| 6 | Lens 3 | 20.126 | (ASP) | 0.288 | Plastic | 1.582 | 30.2 | −10.85 |
| 7 | | 4.785 | (ASP) | 0.413 | | | | |
| 8 | Lens 4 | 29.824 | (ASP) | 0.176 | Plastic | 1.639 | 23.5 | 11.72 |
| 9 | | −9.968 | (ASP) | 0.094 | | | | |
| 10 | Lens 5 | −13.723 | (ASP) | 0.288 | Plastic | 1.669 | 19.5 | 1230.20 |
| 11 | | −13.611 | (ASP) | 1.164 | | | | |
| 12 | Lens 6 | 4.187 | (ASP) | 0.393 | Plastic | 1.511 | 56.8 | −7.58 |
| 13 | | 1.948 | (ASP) | 0.417 | | | | |
| 14 | Lens 7 | 55.427 | (ASP) | 0.262 | Plastic | 1.669 | 19.5 | −101.74 |
| 15 | | 30.488 | (ASP) | 0.200 | | | | |

TABLE 1-continued

1st Embodiment
f = 5.70 mm, Fno = 1.835, HFOV = 21.5 deg.

| Surface # | | Curvature Radius | Thickness | Material | Index | Abbe # | Focal Length |
|---|---|---|---|---|---|---|---|
| 16 | Filter | Plano | 0.110 | Glass | 1.517 | 64.2 | — |
| 17 | | Plano | 0.175 | | | | |
| 18 | Image | Plano | — | | | | |

Note:
Reference wavelength is 587.6 nm (d-line).

TABLE 2

Aspheric Coefficients

| Surface # | 1 | 2 | 4 | 5 | 6 |
|---|---|---|---|---|---|
| k = | −2.0067E−01 | −5.2549E+01 | 9.0000E+01 | −1.3439E+01 | 1.8873E+01 |
| A4 = | 2.3233E−04 | 8.1680E−03 | −1.3503E−01 | −1.1323E−01 | −3.3296E−02 |
| A6 = | 5.0086E−03 | 2.8129E−02 | 3.6875E−01 | 3.8769E−01 | 1.2358E−01 |
| A8 = | −4.1625E−03 | −3.3184E−02 | −4.1651E−01 | −3.3553E−01 | −1.3178E−02 |
| A10 = | 2.1020E−03 | 1.8484E−02 | 2.5821E−01 | 1.6615E−01 | −3.5493E−02 |
| A12 = | −3.6601E−04 | −5.3397E−03 | −8.5111E−02 | −2.8846E−02 | 2.1023E−02 |
| A14 = | — | 6.3788E−04 | 1.1714E−02 | — | −4.8266E−04 |

| Surface # | 7 | 8 | 9 | 10 | 11 |
|---|---|---|---|---|---|
| k = | 1.0905E+01 | 5.6384E+01 | 3.5835E+01 | 8.5541E+01 | 8.2762E+01 |
| A4 = | −2.6052E−02 | −2.6407E−02 | 3.4657E−02 | −6.4355E−02 | −9.4093E−02 |
| A6 = | 1.7850E−02 | −2.9253E−01 | −1.4973E−01 | 1.5954E−01 | 1.1973E−01 |
| A8 = | 4.1158E−02 | 5.3257E−01 | 3.4754E−01 | −8.5986E−02 | −1.1958E−01 |
| A10 = | −7.5970E−02 | −7.1102E−01 | −4.5758E−01 | −9.6937E−02 | 9.6010E−02 |
| A12 = | 3.0554E−02 | 4.8059E−01 | 2.8952E−01 | 1.5100E−02 | −4.3168E−02 |
| A14 = | −3.0262E−03 | −1.3167E−01 | −6.6796E−02 | −3.5101E−03 | 7.9527E−03 |
| A16 = | — | 7.2896E−04 | — | — | — |

| Surface # | 12 | 13 | 14 | 15 |
|---|---|---|---|---|
| k = | −1.5373E+01 | −1.7678E+00 | 6.2828E+01 | 7.1944E+01 |
| A4 = | −1.6215E−01 | −1.8806E−01 | −1.2417E−01 | −1.7386E−01 |
| A6 = | 5.9000E−02 | 9.7173E−02 | 1.2985E−01 | 1.6540E−01 |
| A8 = | −6.4040E−03 | −4.2071E−02 | −8.5032E−02 | −9.6582E−02 |
| A10 = | −2.5408E−03 | 1.3288E−02 | 3.2840E−02 | 3.3416E−02 |
| A12 = | 9.5108E−04 | −2.8999E−03 | −7.0764E−03 | −6.4525E−03 |
| A14 = | −6.7622E−05 | 3.8511E−04 | 7.9669E−04 | 6.4589E−04 |
| A16 = | −4.3416E−06 | −2.2339E−05 | −3.6782E−05 | −2.6172E−05 |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

Figure 3:
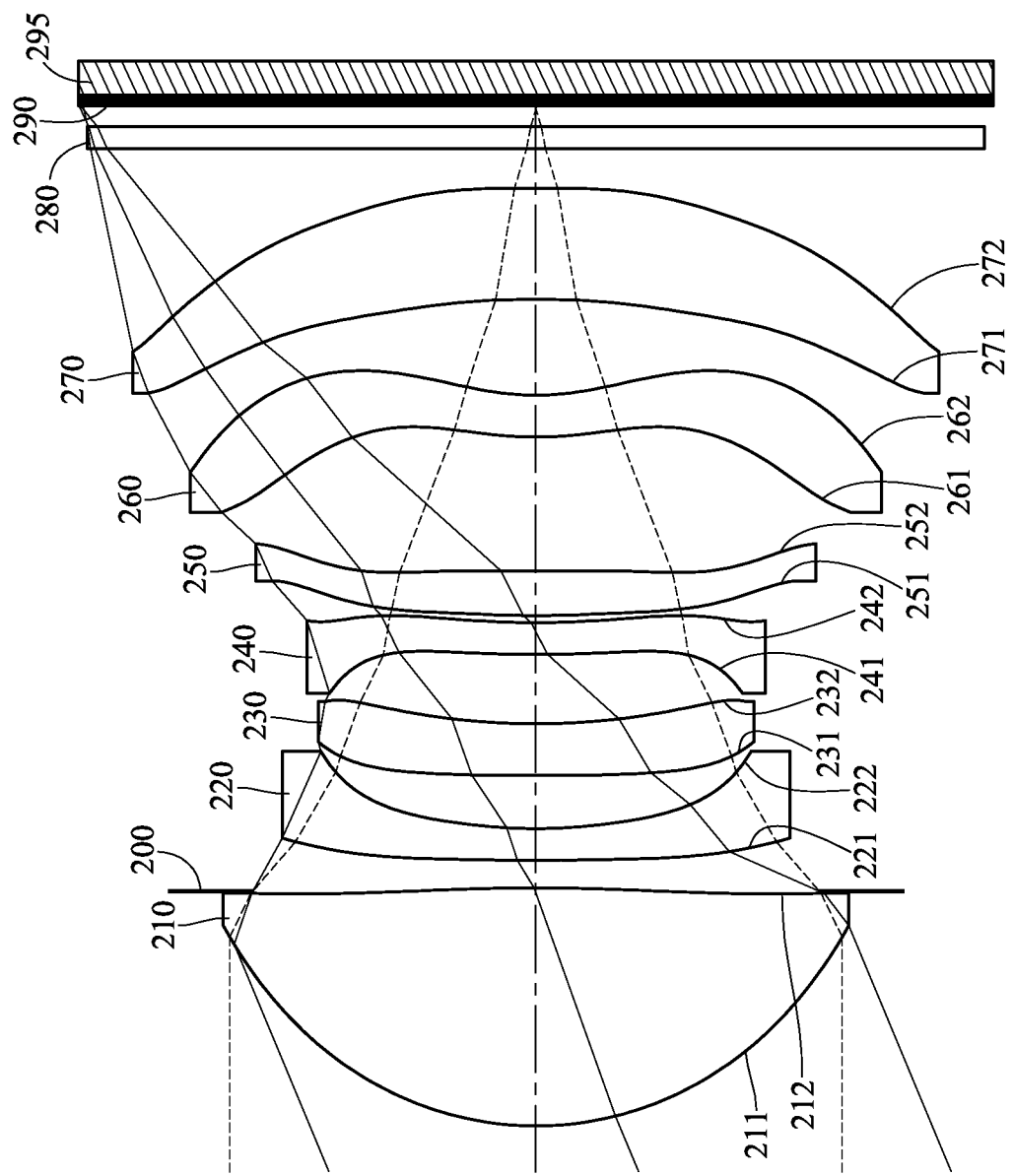
FIG. 3 is a schematic view of an image capturing unit according to the 2nd embodiment of the present disclosure.
Figure 4:
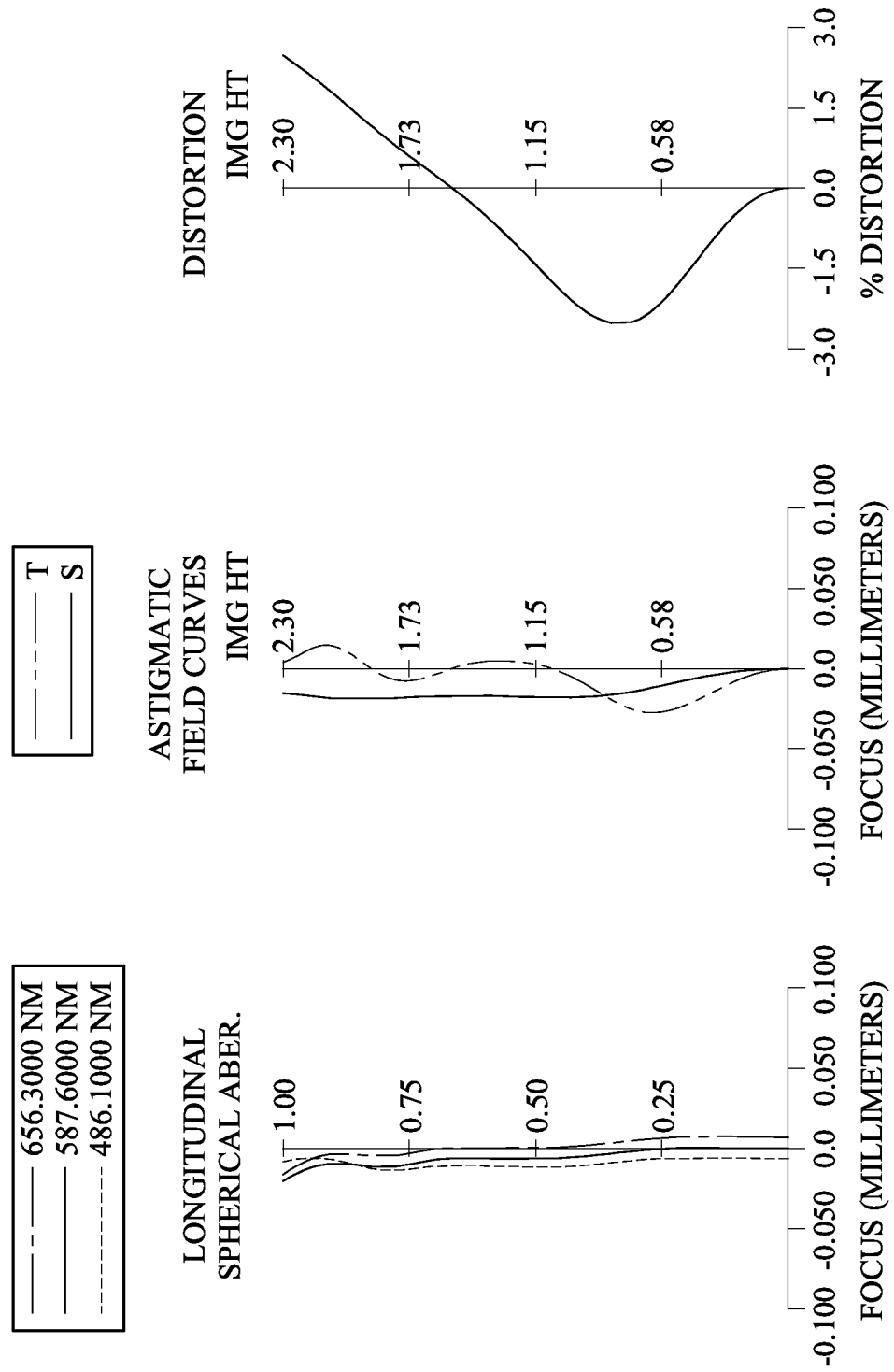
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 295. The optical imaging lens assembly includes, in order from an object side to an image side, a first lens element 210, an aperture stop 200, a second lens element 220, a third lens element 230, a fourth lens element 240, a fifth lens element 250, a sixth lens element 260, a seventh lens element 270, a filter 280 and an image surface 290. The optical imaging lens assembly includes seven lens elements (210, 220, 230, 240, 250, 260 and 270) with no additional lens element disposed between each of the adjacent seven lens elements.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric. The image-side surface 212 of the first lens element 210 has one inflection point.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The image-side surface 232 of the third lens element 230 has one inflection point.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has one inflection point. The image-side surface 242 of the fourth lens element 240 has two inflection points.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. Each of the object-side surface 251 and the image-side surface 252 of the fifth lens element 250 has three inflection points.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has three inflection points. The image-side surface 262 of the sixth lens element 260 has one inflection point. The image-side surface 262 of the sixth lens element 260 has at least one critical point.

The seventh lens element 270 with negative refractive power has an object-side surface 271 being concave in a paraxial region thereof and an image-side surface 272 being convex in a paraxial region thereof. The seventh lens element 270 is made of plastic material and has the object-side surface 271 and the image-side surface 272 being both aspheric. Each of the object-side surface 271 and the image-side surface 272 of the seventh lens element 270 has one inflection point.

The filter 280 is made of glass material and located between the seventh lens element 270 and the image surface 290, and will not affect the focal length of the optical imaging lens assembly. The image sensor 295 is disposed on or near the image surface 290 of the optical imaging lens assembly.

Among the first lens element 210 through the seventh lens element 270, two lens elements (the first lens element 210 and the fifth lens element 250) have positive refractive power. When an Abbe number of each of these two lens elements having positive refractive power is Vp, the following condition is satisfied for one (the fifth lens element 250) of these two lens elements: Vp<25.0.

When a minimum value among all maximum effective radii of the object-side surfaces and the image-side surfaces of the seven lens elements is Ymin, a maximum effective radius of the object-side surface 241 of the fourth lens element 240 is equal to Ymin.

The detailed optical data of the 2nd embodiment are shown in Table 3 and the aspheric surface data are shown in Table 4 below.

TABLE 3

2nd Embodiment
f = 5.40 mm, Fno = 1.75, HFOV = 22.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.637 | (ASP) | 1.201 | Plastic | 1.545 | 56.1 | 2.67 |
| 2 | | −9.552 | (ASP) | −0.016 | | | | |
| 3 | Ape. Stop | Plano | | 0.155 | | | | |
| 4 | Lens 2 | 10.489 | (ASP) | 0.160 | Plastic | 1.660 | 20.4 | −5.09 |
| 5 | | 2.529 | (ASP) | 0.267 | | | | |
| 6 | Lens 3 | 11.827 | (ASP) | 0.262 | Plastic | 1.614 | 26.0 | −8.34 |
| 7 | | 3.543 | (ASP) | 0.350 | | | | |
| 8 | Lens 4 | 7.763 | (ASP) | 0.160 | Plastic | 1.639 | 23.5 | −14.98 |
| 9 | | 4.251 | (ASP) | 0.035 | | | | |
| 10 | Lens 5 | 4.289 | (ASP) | 0.225 | Plastic | 1.688 | 18.7 | 8.00 |
| 11 | | 19.013 | (ASP) | 0.676 | | | | |
| 12 | Lens 6 | 1.749 | (ASP) | 0.211 | Plastic | 1.544 | 55.9 | −10.42 |
| 13 | | 1.279 | (ASP) | 0.484 | | | | |
| 14 | Lens 7 | −5.043 | (ASP) | 0.561 | Plastic | 1.688 | 18.7 | −10.39 |
| 15 | | −17.903 | (ASP) | 0.200 | | | | |
| 16 | Filter | Plano | | 0.110 | Glass | 1.517 | 64.2 | — |
| 17 | | Plano | | 0.103 | | | | |
| 18 | Image | Plano | | — | | | | |

Note:
Reference wavelength is 587.6 nm (d-line).

TABLE 4

Aspheric Coefficients

| Surface # | 1 | 2 | 4 | 5 | 6 |
|---|---|---|---|---|---|
| k = | −2.2766E−01 | −5.4856E+01 | −7.9199E+01 | −9.1163E+00 | −4.8382E+00 |
| A4 = | 1.4912E−03 | 1.0413E−02 | −1.3559E−01 | −1.0343E−01 | −3.8612E−02 |

TABLE 4-continued

Aspheric Coefficients

| A6 = | 3.5588E−03 | 2.8248E−02 | 3.7303E−01 | 3.9738E−01 | 1.2885E−01 |
|---|---|---|---|---|---|
| A8 = | −3.6777E−03 | −3.4511E−02 | −4.1241E−01 | −3.2838E−01 | −2.3027E−02 |
| A10 = | 2.3606E−03 | 1.8313E−02 | 2.5615E−01 | 1.6326E−01 | −3.4149E−02 |
| A12 = | −5.2752E−04 | −4.9013E−03 | −8.6127E−02 | −1.1769E−02 | 3.8434E−02 |
| A14 = | — | 5.4000E−04 | 1.2196E−02 | — | −8.1045E−03 |

| Surface # | 7 | 8 | 9 | 10 | 11 |
|---|---|---|---|---|---|
| k = | 6.0228E+00 | −3.8499E+00 | −8.2589E+01 | −4.2683E+01 | 8.6098E+01 |
| A4 = | −2.9950E−02 | 6.3122E−02 | −5.3406E−03 | −2.7318E−01 | −2.0472E−01 |
| A6 = | 6.6405E−03 | −4.7927E−01 | 2.4855E−01 | 6.4502E−01 | 2.6392E−01 |
| A8 = | 3.5932E−02 | 6.8554E−01 | −1.3484E+00 | −5.9889E−01 | 1.1220E−02 |
| A10 = | −7.6446E−02 | −1.5794E+00 | 2.4269E+00 | 3.1603E−01 | −1.2414E−01 |
| A12 = | 2.6630E−02 | 2.5526E+00 | −2.3204E+00 | −9.4956E−02 | 5.6797E−02 |
| A14 = | −1.3644E−02 | −2.1100E+00 | 1.1864E+00 | 1.1653E−02 | −8.2630E−03 |
| A16 = | — | 6.5852E−01 | −2.4730E−01 | — | — |

| Surface # | 12 | 13 | 14 | 15 |
|---|---|---|---|---|
| k = | −1.2330E+01 | −3.1109E+00 | −4.7733E+01 | 6.6043E+01 |
| A4 = | −1.8032E−01 | −2.9604E−01 | −1.7719E−01 | −3.3778E−01 |
| A6 = | −3.0002E−01 | 1.2531E−01 | 3.4155E−01 | 3.8233E−01 |
| A8 = | 5.2843E−01 | −5.1007E−03 | −3.1854E−01 | −2.2757E−01 |
| A10 = | −3.7546E−01 | −3.4137E−02 | 1.5489E−01 | 7.2672E−02 |
| A12 = | 1.3646E−01 | 2.0267E−02 | −4.1309E−02 | −1.2015E−02 |
| A14 = | −2.3250E−02 | −5.0364E−03 | 5.7450E−03 | 8.3175E−04 |
| A16 = | 1.3091E−03 | 4.7582E−04 | −3.2467E−04 | −4.3169E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.40 | SD/TD | 0.75 |
| Fno | 1.75 | TL/f | 0.95 |
| HFOV [deg.] | 22.6 | TL/ImgH | 2.24 |
| V7 | 18.7 | f/ImgH | 2.35 |
| ΣVi | 219.3 | f/EPD | 1.75 |
| R1/CT1 | 1.36 | TL/EPD | 1.67 |
| CT1/CT7 | 2.14 | BL/TD | 0.09 |
| T67/CT6 | 2.29 | tan(HFOV) | 0.42 |
| T23/T34 | 0.76 | Yc62/CT6 | 4.17 |
| f/R1 | 3.30 | (R1 × R1)/(f × CT1) | 0.41 |
| f/R12 | 4.22 | T56/(ΣAT − T56) | 0.53 |
| |f/R14| | 0.30 | TL/(EPD + T56) | 1.37 |
| (R13 − R14)/(R13 + R14) | −0.56 | EPD/(ΣCT − CT1) | 1.95 |
| f/f2 | −1.06 | (f × TL)/(EPD × ImgH) | 3.91 |
| f/f7 | −0.52 | — | — |

3rd Embodiment

Figure 5:
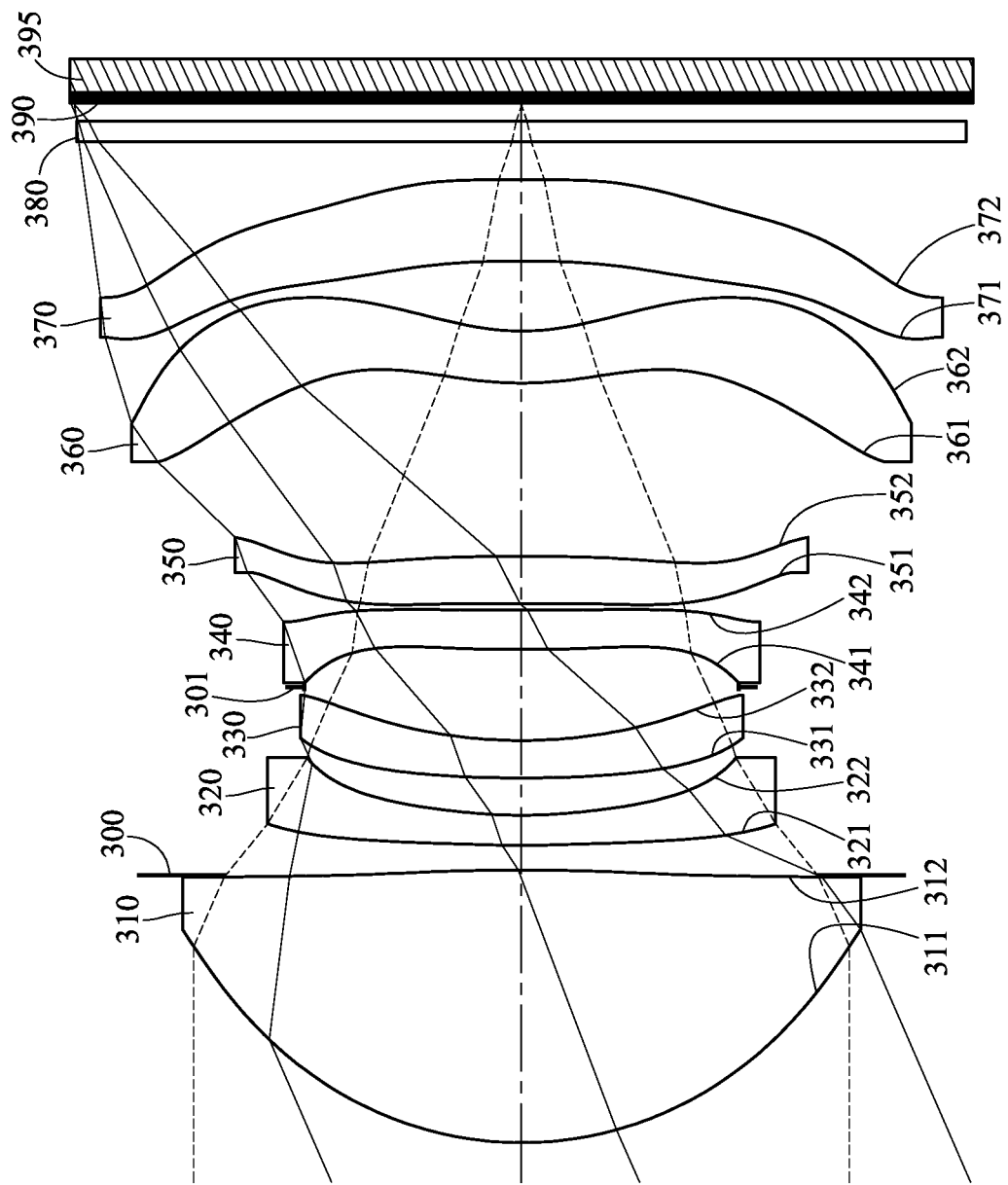
FIG. 5 is a schematic view of an image capturing unit according to the 3rd embodiment of the present disclosure.
Figure 6:
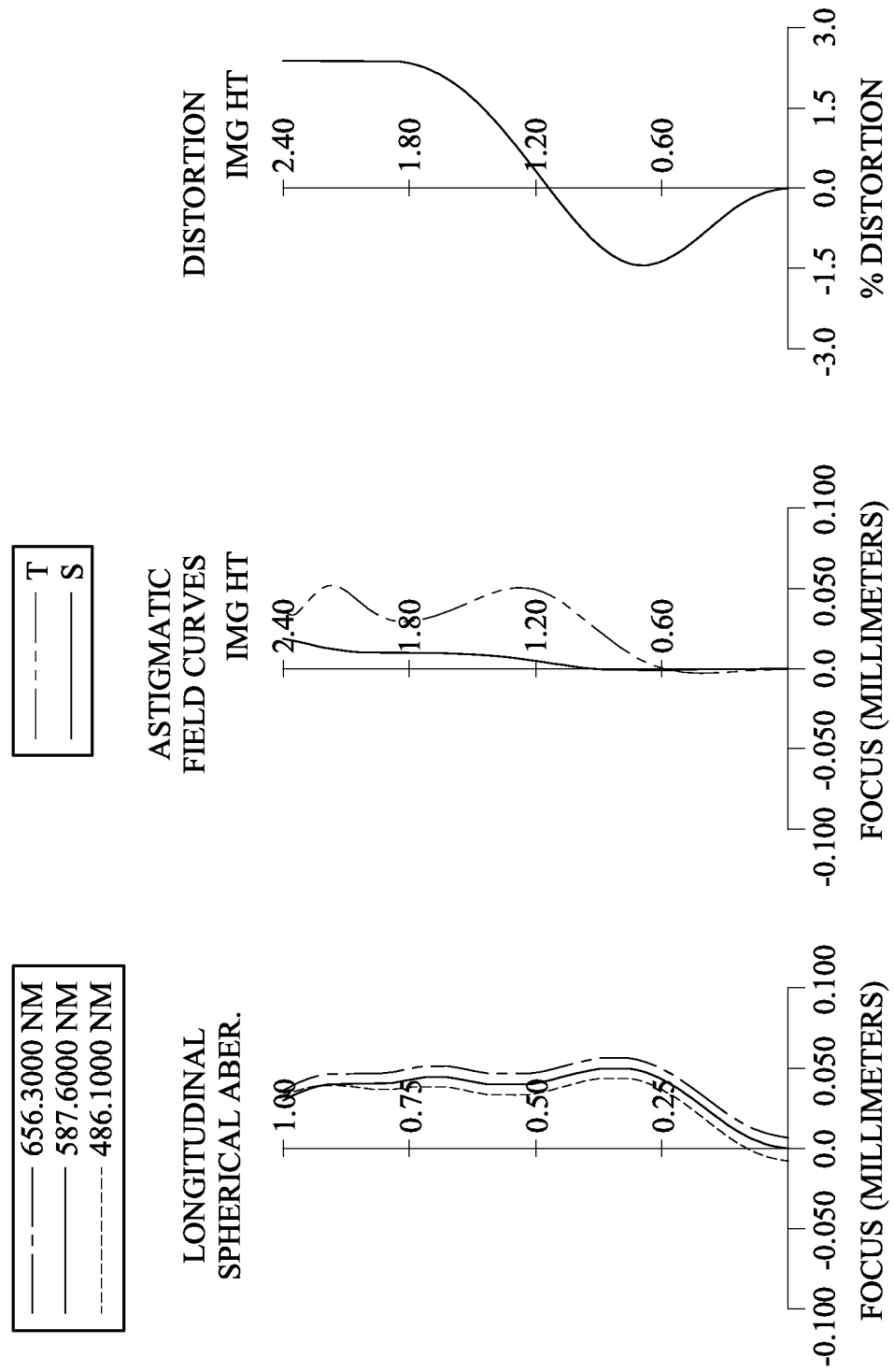
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 395. The optical imaging lens assembly includes, in order from an object side to an image side, a first lens element 310, an aperture stop 300, a second lens element 320, a third lens element 330, a stop 301, a fourth lens element 340, a fifth lens element 350, a sixth lens element 360, a seventh lens element 370, a filter 380 and an image surface 390. The optical imaging lens assembly includes seven lens elements (310, 320, 330, 340, 350, 360 and 370) with no additional lens element disposed between each of the adjacent seven lens elements.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric. The image-side surface 312 of the first lens element 310 has one inflection point.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The image-side surface 332 of the third lens element 330 has one inflection point.

The fourth lens element 340 with positive refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has one inflection point. The image-side surface 342 of the fourth lens element 340 has two inflection points.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has three inflection points. The image-side surface 352 of the fifth lens element 350 has two critical points.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. Each of the object-side surface 361 and the image-side surface 362 of the sixth lens element 360 has two inflection points. The image-side surface 362 of the sixth lens element 360 has at least one critical point.

The seventh lens element 370 with negative refractive power has an object-side surface 371 being concave in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has four inflection points. The image-side surface 372 of the seventh lens element 370 has five inflection points.

The filter 380 is made of glass material and located between the seventh lens element 370 and the image surface 390, and will not affect the focal length of the optical imaging lens assembly. The image sensor 395 is disposed on or near the image surface 390 of the optical imaging lens assembly.

Among the first lens element 310 through the seventh lens element 370, three lens elements (the first lens element 310, the fourth lens element 340 and the fifth lens element 350) have positive refractive power. When an Abbe number of each of these three lens elements having positive refractive power is Vp, the following condition is satisfied for two (the fourth lens element 340 and the fifth lens element 350) of these three lens elements: Vp<25.0.

The detailed optical data of the 3rd embodiment are shown in Table 5 and the aspheric surface data are shown in Table 6 below.

TABLE 5

3rd Embodiment
f = 5.34 mm, Fno = 1.53, HFOV = 23.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.872 | (ASP) | 1.453 | Plastic | 1.545 | 56.1 | 3.02 |
| 2 | | −9.961 | (ASP) | −0.027 | | | | |
| 3 | Ape. Stop | Plano | | 0.158 | | | | |
| 4 | Lens 2 | 6.389 | (ASP) | 0.160 | Plastic | 1.669 | 19.5 | −6.69 |
| 5 | | 2.604 | (ASP) | 0.198 | | | | |
| 6 | Lens 3 | 6.284 | (ASP) | 0.200 | Plastic | 1.639 | 23.5 | −7.42 |
| 7 | | 2.668 | (ASP) | 0.284 | | | | |
| 8 | Stop | Plano | | 0.200 | | | | |
| 9 | Lens 4 | 7.530 | (ASP) | 0.209 | Plastic | 1.639 | 23.5 | 38.87 |
| 10 | | 10.691 | (ASP) | 0.035 | | | | |
| 11 | Lens 5 | 16.175 | (ASP) | 0.252 | Plastic | 1.688 | 18.7 | 16.09 |
| 12 | | −34.843 | (ASP) | 0.923 | | | | |
| 13 | Lens 6 | 1.807 | (ASP) | 0.278 | Plastic | 1.544 | 55.9 | −10.39 |
| 14 | | 1.295 | (ASP) | 0.372 | | | | |
| 15 | Lens 7 | −7.514 | (ASP) | 0.434 | Plastic | 1.688 | 18.7 | −10.87 |
| 16 | | 1506.767 | (ASP) | 0.200 | | | | |
| 17 | Filter | Plano | | 0.110 | Glass | 1.517 | 64.2 | — |
| 18 | | Plano | | 0.096 | | | | |
| 19 | Image | Plano | | — | | | | |

Note:
Reference wavelength is 587.6 nm (d-line).
An effective radius of the stop 301 (Surface 8) is 1.154 mm.

TABLE 6

Aspheric Coefficients

| Surface # | 1 | 2 | 4 | 5 | 6 |
|---|---|---|---|---|---|
| k = | −2.6434E−01 | −2.9352E+01 | −7.1644E+01 | −1.3231E+01 | 8.3352E+00 |
| A4 = | −8.3976E−04 | 1.0369E−02 | −1.5505E−01 | −1.2761E−01 | −3.4192E−02 |
| A6 = | 6.1898E−03 | 2.8225E−02 | 3.6473E−01 | 3.7268E−01 | 1.1063E−01 |
| A8 = | −4.5218E−03 | −3.5181E−02 | −4.1179E−01 | −3.4336E−01 | −3.9619E−02 |
| A10 = | 1.9111E−03 | 1.8282E−02 | 2.5919E−01 | 1.5933E−01 | −3.9490E−02 |
| A12 = | −3.1078E−04 | −4.6417E−03 | −8.3809E−02 | −1.7819E−02 | 4.2484E−02 |
| A14 = | — | 4.6995E−04 | 1.0942E−02 | 2.8717E−14 | −9.0749E−03 |

TABLE 6-continued

| Aspheric Coefficients | | | | | |
|---|---|---|---|---|---|
| Surface # | 7 | 9 | 10 | 11 | 12 |
| k = | 3.5109E+00 | −3.8499E+00 | −8.2589E+01 | 5.8511E+01 | 1.3297E+01 |
| A4 = | −3.3863E−02 | −4.0445E−02 | −1.9388E−01 | −2.9042E−01 | −1.5745E−01 |
| A6 = | 1.1980E−02 | −2.4008E−02 | 5.9439E−01 | 6.6115E−01 | 2.6039E−01 |
| A8 = | 2.0069E−02 | −1.6321E−01 | −1.1702E+00 | −6.2810E−01 | −2.2245E−01 |
| A10 = | −6.9988E−02 | 2.3148E−03 | 1.3319E+00 | 3.3132E−01 | 1.4548E−01 |
| A12 = | 4.4332E−02 | 3.5654E−01 | −9.0423E−01 | −9.1244E−02 | −5.2654E−02 |
| A14 = | −1.4022E−02 | −3.6057E−01 | 3.3385E−01 | 9.7675E−03 | 7.2073E−03 |
| A16 = | −8.9218E−15 | 1.0703E−01 | −5.0021E−02 | — | — |

| Surface # | 13 | 14 | 15 | 16 |
|---|---|---|---|---|
| k = | −7.0882E+00 | −2.4303E+00 | −8.9897E+01 | 9.0000E+01 |
| A4 = | −1.6283E−01 | −2.2123E−01 | −2.1856E−01 | −3.8091E−01 |
| A6 = | −7.4849E−02 | 6.2571E−02 | 3.1089E−01 | 4.2744E−01 |
| A8 = | 1.1836E−01 | 3.2161E−02 | −1.9935E−01 | −2.4527E−01 |
| A10 = | −5.5284E−02 | −3.8752E−02 | 6.8056E−02 | 8.1844E−02 |
| A12 = | 1.2766E−02 | 1.5006E−02 | −1.3281E−02 | −1.6498E−02 |
| A14 = | −1.4619E−03 | −2.6780E−03 | 1.4306E−03 | 1.8748E−03 |
| A16 = | 6.6673E−05 | 1.8376E−04 | −6.6487E−05 | −9.1390E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.34 | SD/TD | 0.72 |
| Fno | 1.53 | TL/f | 1.04 |
| HFOV [deg.] | 23.5 | TL/ImgH | 2.31 |
| V7 | 18.7 | f/ImgH | 2.23 |
| ΣVi | 215.8 | f/EPD | 1.53 |
| R1/CT1 | 1.29 | TL/EPD | 1.59 |
| CT1/CT7 | 3.35 | BL/TD | 0.08 |
| T67/CT6 | 1.34 | tan(HFOV) | 0.44 |
| T23/T34 | 0.41 | Yc62/CT6 | 3.99 |
| f/R1 | 2.85 | (R1 × R1)/(f × CT1) | 0.45 |
| f/R12 | 4.12 | T56/(ΣAT − T56) | 0.76 |
| |f/R14| | 0.0035 | TL/(EPD + T56) | 1.25 |
| (R13 − R14)/(R13 + R14) | −1.01 | EPD/(ΣCT − CT1) | 2.28 |
| f/f2 | −0.80 | (f × TL)/(EPD × ImgH) | 3.53 |
| f/f7 | −0.49 | — | — |

4th Embodiment

Figure 7:
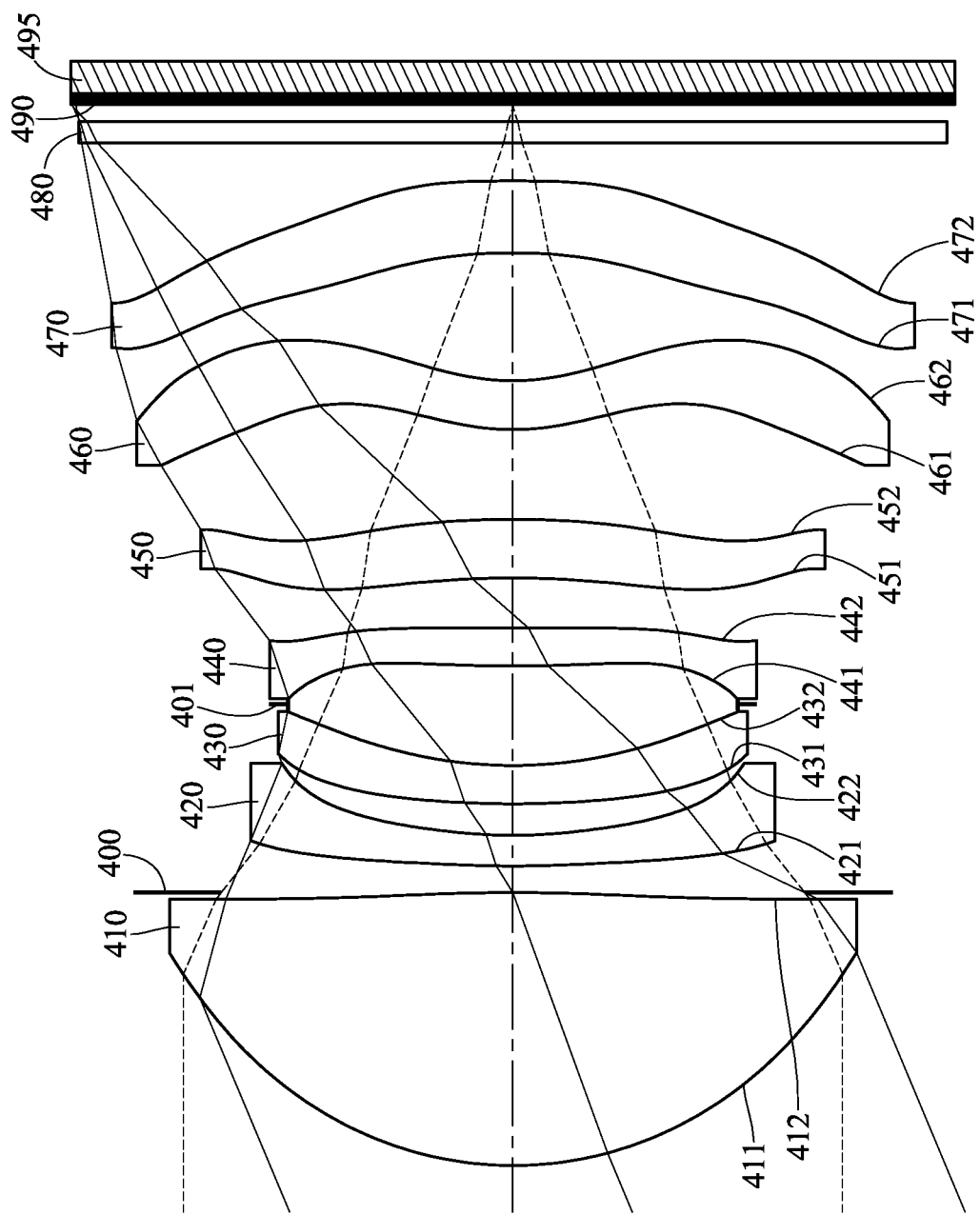
FIG. 7 is a schematic view of an image capturing unit according to the 4th embodiment of the present disclosure.
Figure 8:
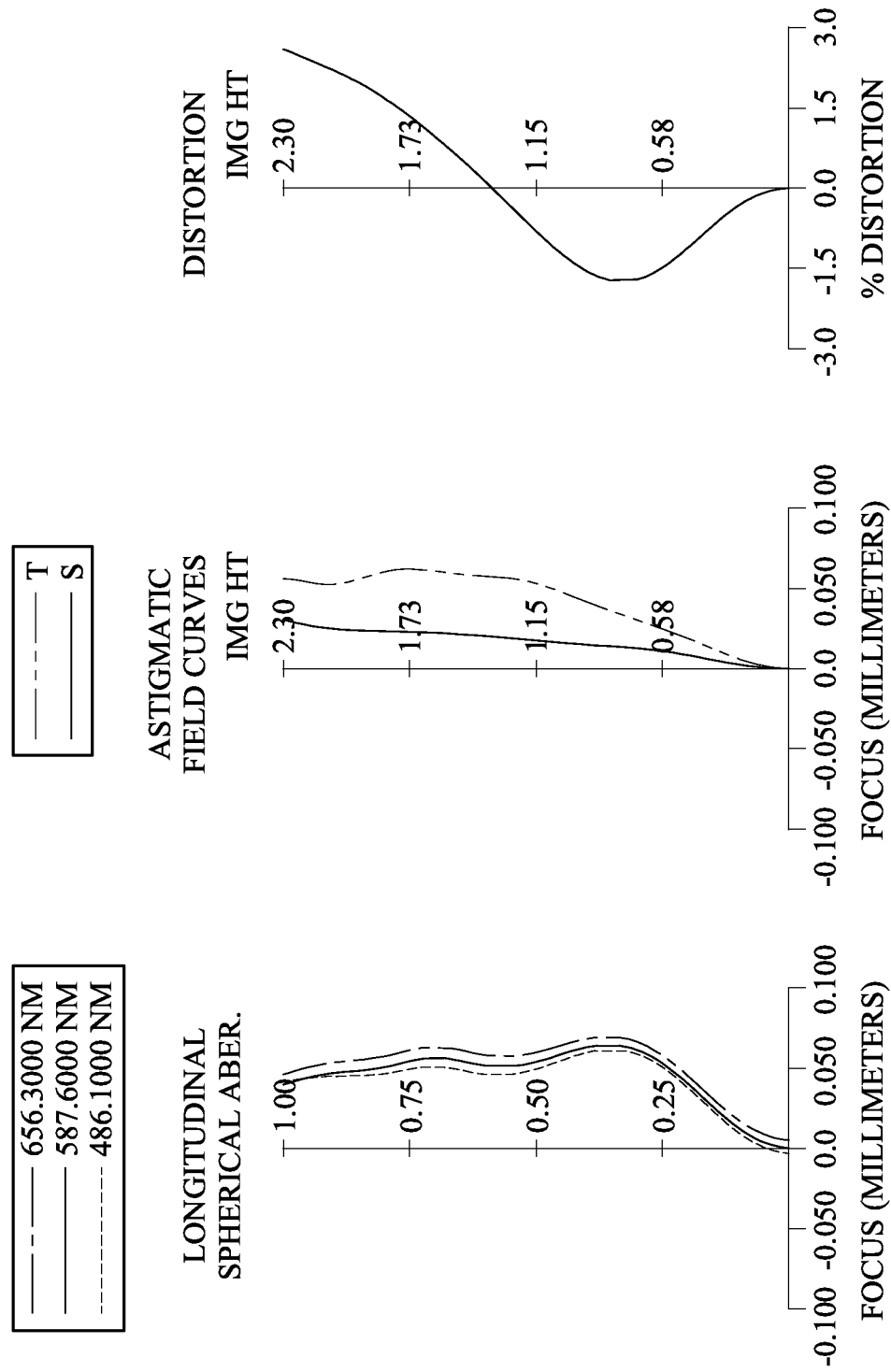
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 495. The optical imaging lens assembly includes, in order from an object side to an image side, a first lens element 410, an aperture stop 400, a second lens element 420, a third lens element 430, a stop 401, a fourth lens element 440, a fifth lens element 450, a sixth lens element 460, a seventh lens element 470, a filter 480 and an image surface 490. The optical imaging lens assembly includes seven lens elements (410, 420, 430, 440, 450, 460 and 470) with no additional lens element disposed between each of the adjacent seven lens elements.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric. The image-side surface 412 of the first lens element 410 has one inflection point.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The image-side surface 432 of the third lens element 430 has two inflection points.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has one inflection point. The image-side surface 442 of the fourth lens element 440 has two inflection points.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. Each of the object-side surface 451 and the image-side surface 452 of the fifth lens element 450 has two inflection points.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. Each of the object-side surface 461 and the image-side surface 462 of the sixth lens element 460 has two inflection points. The image-side surface 462 of the sixth lens element 460 has at least one critical point.

The seventh lens element 470 with negative refractive power has an object-side surface 471 being concave in a paraxial region thereof and an image-side surface 472 being convex in a paraxial region thereof. The seventh lens element 470 is made of plastic material and has the object-side surface 471 and the image-side surface 472 being both aspheric. Each of the object-side surface 471 and the image-side surface 472 of the seventh lens element 470 has three inflection points.

The filter 480 is made of glass material and located between the seventh lens element 470 and the image surface 490, and will not affect the focal length of the optical imaging lens assembly. The image sensor 495 is disposed on or near the image surface 490 of the optical imaging lens assembly.

Among the first lens element 410 through the seventh lens element 470, three lens elements (the first lens element 410, the fourth lens element 440 and the sixth lens element 460) have positive refractive power. When an Abbe number of each of these three lens elements having positive refractive power is Vp, the following condition is satisfied for one (the fourth lens element 440) of these three lens elements: Vp<25.0.

When a minimum value among all maximum effective radii of the object-side surfaces and the image-side surfaces of the seven lens elements is Ymin, a maximum effective radius of the object-side surface 441 of the fourth lens element 440 is equal to Ymin.

The detailed optical data of the 4th embodiment are shown in Table 7 and the aspheric surface data are shown in Table 8 below.

TABLE 7

4th Embodiment
f = 5.31 mm, Fno = 1.54, HFOV = 22.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.885 | (ASP) | 1.425 | Plastic | 1.545 | 56.1 | 3.04 |
| 2 | | −9.966 | (ASP) | −0.001 | | | | |
| 3 | Ape. Stop | Plano | | 0.140 | | | | |
| 4 | Lens 2 | 5.257 | (ASP) | 0.160 | Plastic | 1.669 | 19.5 | −7.25 |
| 5 | | 2.491 | (ASP) | 0.165 | | | | |
| 6 | Lens 3 | 5.354 | (ASP) | 0.200 | Plastic | 1.639 | 23.5 | −6.80 |
| 7 | | 2.362 | (ASP) | 0.319 | | | | |
| 8 | Stop | Plano | | 0.200 | | | | |
| 9 | Lens 4 | 6.688 | (ASP) | 0.198 | Plastic | 1.639 | 23.5 | 10.93 |
| 10 | | 159.250 | (ASP) | 0.262 | | | | |
| 11 | Lens 5 | −4.799 | (ASP) | 0.306 | Plastic | 1.688 | 18.7 | −42.85 |
| 12 | | −5.880 | (ASP) | 0.469 | | | | |
| 13 | Lens 6 | 1.268 | (ASP) | 0.255 | Plastic | 1.544 | 55.9 | 366.05 |
| 14 | | 1.185 | (ASP) | 0.668 | | | | |
| 15 | Lens 7 | −3.119 | (ASP) | 0.376 | Plastic | 1.688 | 18.7 | −6.04 |
| 16 | | −13.126 | (ASP) | 0.200 | | | | |
| 17 | Filter | Plano | | 0.110 | Glass | 1.517 | 64.2 | — |
| 18 | | Plano | | 0.089 | | | | |
| 19 | Image | Plano | | — | | | | |

Note:
Reference wavelength is 587.6 nm (d-line).
An effective radius of the stop 401 (Surface 8) is 1.172 mm.

TABLE 8

Aspheric Coefficients

| Surface # | 1 | 2 | 4 | 5 | 6 |
|---|---|---|---|---|---|
| k = | −2.7037E−01 | −2.5456E+01 | −4.7271E+01 | −1.3116E+01 | 5.4184E+00 |
| A4 = | −8.9773E−04 | 1.1002E−02 | −1.5709E−01 | −1.2757E−01 | −3.6413E−02 |
| A6 = | 6.2665E−03 | 2.8702E−02 | 3.6427E−01 | 3.7148E−01 | 1.0853E−01 |
| A8 = | −4.4601E−03 | −3.5310E−02 | −4.1191E−01 | −3.4646E−01 | −4.3960E−02 |
| A10 = | 1.8334E−03 | 1.8249E−02 | 2.5890E−01 | 1.5740E−01 | −3.9287E−02 |
| A12 = | −2.8697E−04 | −4.6269E−03 | −8.3576E−02 | −1.7697E−02 | 4.4103E−02 |
| A14 = | — | 4.6848E−04 | 1.0906E−02 | −9.3080E−13 | −9.2285E−03 |

| Surface # | 7 | 9 | 10 | 11 | 12 |
|---|---|---|---|---|---|
| k = | 2.4405E+00 | −3.8499E+00 | −8.2589E+01 | −8.6319E+01 | −2.8949E+01 |
| A4 = | −3.9258E−02 | −5.0876E−02 | 1.8959E−02 | −7.0775E−02 | −1.1782E−01 |
| A6 = | 3.6726E−03 | −8.8648E−02 | −1.7660E−01 | 9.8032E−02 | 1.3303E−01 |
| A8 = | 2.0738E−02 | −3.3123E−02 | 2.3047E−01 | −9.7617E−03 | −6.5109E−02 |
| A10 = | −6.7934E−02 | 1.2485E−01 | −2.5580E−01 | −1.9570E−02 | 2.8634E−02 |

TABLE 8-continued

Aspheric Coefficients

| A12 = | 4.4451E−02 | −1.7624E−01 | 1.9704E−01 | 9.2678E−03 | −8.4372E−03 |
|---|---|---|---|---|---|
| A14 = | −1.2369E−02 | 1.3982E−01 | −7.1000E−02 | −1.4556E−03 | 9.2733E−04 |
| A16 = | −1.6372E−13 | −4.3086E−02 | 8.7651E−03 | — | — |

| Surface # | 13 | 14 | 15 | 16 |
|---|---|---|---|---|
| k = | −4.2102E+00 | −1.9131E+00 | −2.6209E+01 | −9.0000E+01 |
| A4 = | −1.5023E−01 | −2.1442E−01 | −3.1051E−01 | −4.3867E−01 |
| A6 = | −6.5734E−02 | 3.7498E−02 | 4.5068E−01 | 5.0865E−01 |
| A8 = | 6.5631E−02 | 4.4258E−02 | −2.9970E−01 | −3.0493E−01 |
| A10 = | −1.0596E−01 | −4.5170E−02 | 1.0824E−01 | 1.0767E−01 |
| A12 = | −2.9259E−03 | 1.8717E−02 | −2.2382E−02 | −2.2984E−02 |
| A14 = | 1.0321E−03 | −3.7110E−03 | 2.5331E−03 | 2.7581E−03 |
| A16 = | −8.0299E−05 | 2.8500E−04 | −1.2247E−04 | −1.4171E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.31 | SD/TD | 0.72 |
| Fno | 1.54 | TL/f | 1.04 |
| HFOV [deg.] | 22.7 | TL/ImgH | 2.41 |
| V7 | 18.7 | f/ImgH | 2.31 |
| ΣVi | 215.8 | f/EPD | 1.54 |
| R1/CT1 | 1.32 | TL/EPD | 1.61 |
| CT1/CT7 | 3.79 | BL/TD | 0.08 |
| T67/CT6 | 2.62 | tan(HFOV) | 0.42 |
| T23/T34 | 0.32 | Yc62/CT6 | 4.39 |
| f/R1 | 2.81 | (R1 × R1)/(f × CT1) | 0.47 |
| f/R12 | 4.48 | T56/(ΣAT − T56) | 0.27 |
| |f/R14| | 0.40 | TL/(EPD + T56) | 1.42 |
| (R13 − R14)/(R13 + R14) | −0.62 | EPD/(ΣCT − CT1) | 2.30 |
| f/f2 | −0.73 | (f × TL)/(EPD × ImgH) | 3.72 |
| f/f7 | −0.88 | — | — |

5th Embodiment

Figure 9:
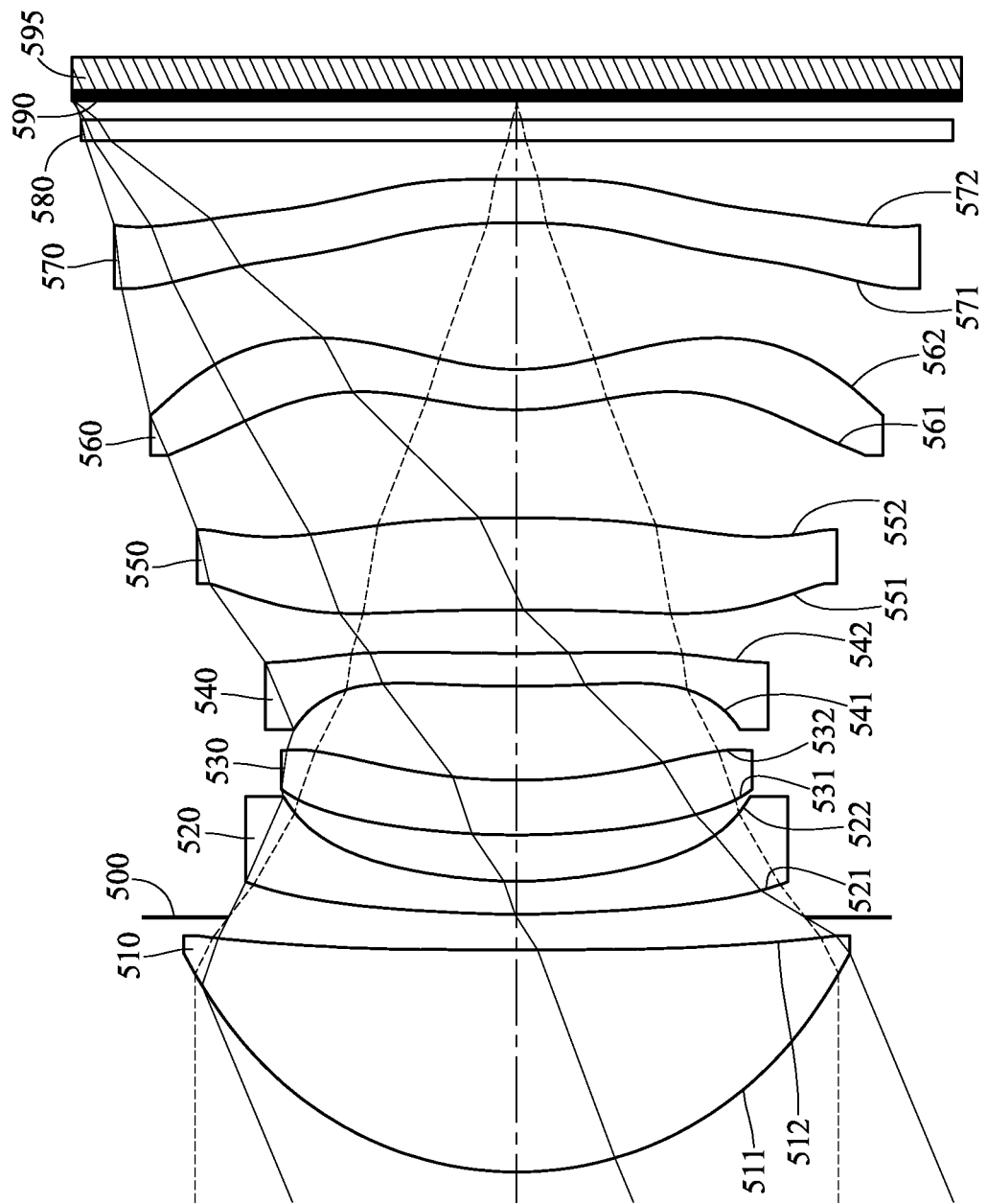
FIG. 9 is a schematic view of an image capturing unit according to the 5th embodiment of the present disclosure.
Figure 10:
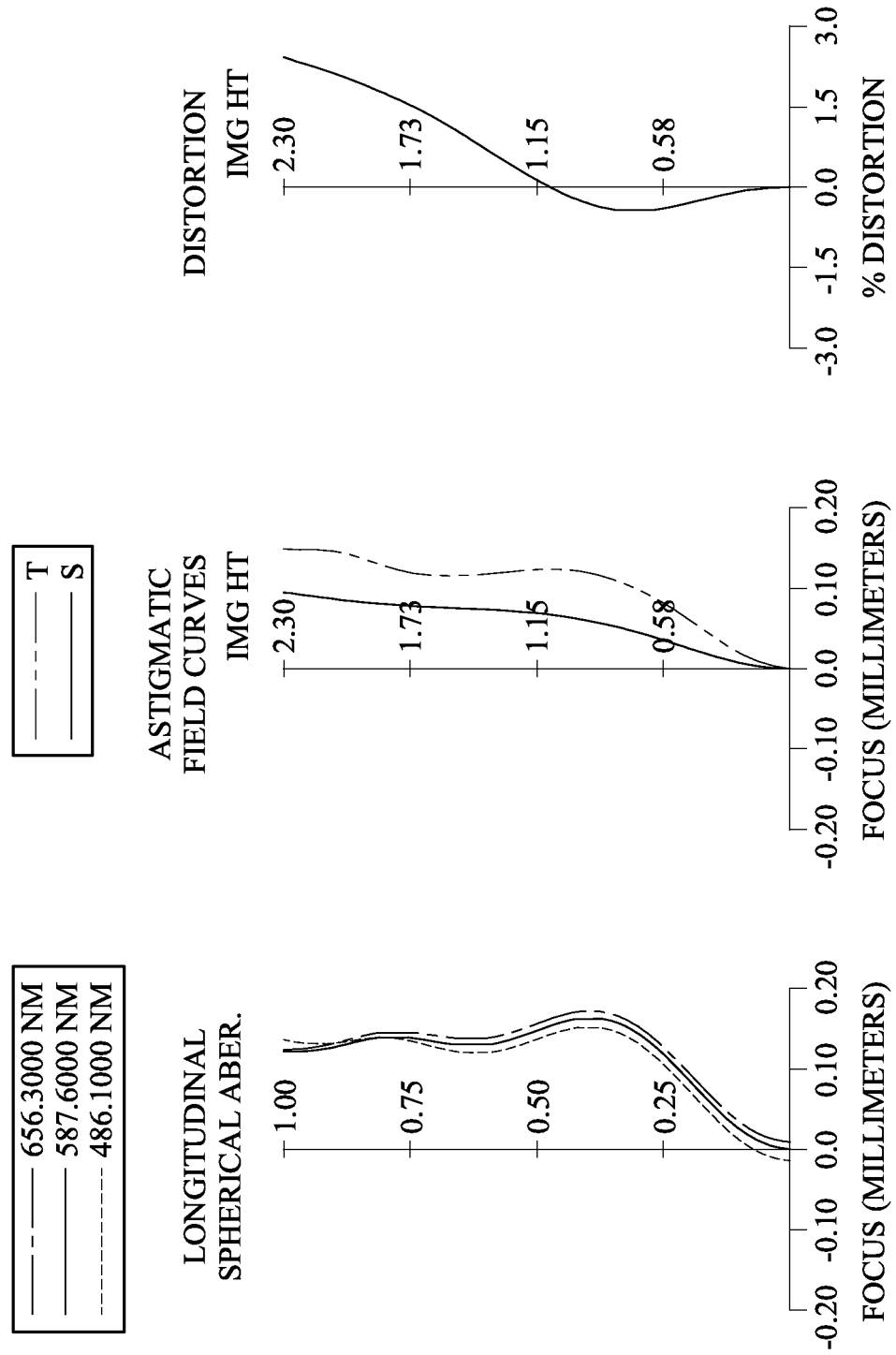
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 595. The optical imaging lens assembly includes, in order from an object side to an image side, a first lens element 510, an aperture stop 500, a second lens element 520, a third lens element 530, a fourth lens element 540, a fifth lens element 550, a sixth lens element 560, a seventh lens element 570, a filter 580 and an image surface 590.

The optical imaging lens assembly includes seven lens elements (510, 520, 530, 540, 550, 560 and 570) with no additional lens element disposed between each of the adjacent seven lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The image-side surface 532 of the third lens element 530 has one inflection point.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has one inflection point. The image-side surface 542 of the fourth lens element 540 has three inflection points.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. Each of the object-side surface 551 and the image-side surface 552 of the fifth lens element 550 has two inflection points.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. Each of the object-side surface 561 and the image-side surface 562 of the sixth lens element 560 has three inflection points. The image-side surface 562 of the sixth lens element 560 has at least one critical point.

The seventh lens element 570 with negative refractive power has an object-side surface 571 being concave in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has three inflection points. The image-side surface 572 of the seventh lens element 570 has four inflection points.

The filter 580 is made of glass material and located between the seventh lens element 570 and the image surface 590, and will not affect the focal length of the optical imaging lens assembly. The image sensor 595 is disposed on or near the image surface 590 of the optical imaging lens assembly.

Among the first lens element 510 through the seventh lens element 570, three lens elements (the first lens element 510, the fourth lens element 540 and the fifth lens element 550) have positive refractive power. When an Abbe number of each of these three lens elements having positive refractive power is Vp, the following condition is satisfied for two (the fourth lens element 540 and the fifth lens element 550) of these three lens elements: Vp<25.0.

When a minimum value among all maximum effective radii of the object-side surfaces and the image-side surfaces of the seven lens elements is Ymin, a maximum effective radius of the object-side surface 541 of the fourth lens element 440 is equal to Ymin.

The detailed optical data of the 5th embodiment are shown in Table 9 and the aspheric surface data are shown in Table 10 below.

TABLE 9

5th Embodiment
f = 5.16 mm, Fno = 1.55, HFOV = 22.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.802 | (ASP) | 1.150 | Plastic | 1.545 | 56.1 | 3.37 |
| 2 | | 74.008 | (ASP) | 0.169 | | | | |
| 3 | Ape. Stop | Plano | | 0.016 | | | | |
| 4 | Lens 2 | 5.170 | (ASP) | 0.171 | Plastic | 1.669 | 19.5 | −6.45 |
| 5 | | 2.321 | (ASP) | 0.239 | | | | |
| 6 | Lens 3 | 4.039 | (ASP) | 0.283 | Plastic | 1.639 | 23.5 | −17.98 |
| 7 | | 2.906 | (ASP) | 0.487 | | | | |
| 8 | Lens 4 | 5.736 | (ASP) | 0.170 | Plastic | 1.650 | 21.5 | 20.11 |
| 9 | | 10.098 | (ASP) | 0.225 | | | | |
| 10 | Lens 5 | −32.405 | (ASP) | 0.477 | Plastic | 1.672 | 18.8 | 26.66 |
| 11 | | −11.605 | (ASP) | 0.559 | | | | |
| 12 | Lens 6 | 1.468 | (ASP) | 0.210 | Plastic | 1.544 | 55.9 | −25.62 |
| 13 | | 1.261 | (ASP) | 0.759 | | | | |
| 14 | Lens 7 | −4.156 | (ASP) | 0.224 | Plastic | 1.688 | 18.7 | −5.11 |
| 15 | | 23.323 | (ASP) | 0.200 | | | | |
| 16 | Filter | Plano | | 0.110 | Glass | 1.517 | 64.2 | — |
| 17 | | Plano | | 0.096 | | | | |
| 18 | Image | Plano | | — | | | | |

Note:
Reference wavelength is 587.6 nm (d-line).

TABLE 10

Aspheric Coefficients

| Surface # | 1 | 2 | 4 | 5 | 6 |
|---|---|---|---|---|---|
| k = | −2.2330E−01 | 9.0000E+01 | −1.2050E+01 | −6.2067E+00 | −3.0770E+00 |
| A4 = | −1.3189E−03 | 3.3393E−03 | −1.5486E−01 | −1.2599E−01 | −5.0804E−02 |
| A6 = | 8.1261E−03 | 2.9399E−02 | 3.6134E−01 | 3.7204E−01 | 1.0663E−01 |
| A8 = | −4.6979E−03 | −3.5530E−02 | −4.1314E−01 | −3.4260E−01 | −4.3040E−02 |
| A10 = | 1.6757E−03 | 1.8264E−02 | 2.5943E−01 | 1.5716E−01 | −3.7915E−02 |
| A12 = | −2.3387E−04 | −4.4644E−03 | −8.3130E−02 | −1.8838E−02 | 4.4183E−02 |
| A14 = | — | 4.2774E−04 | 1.0667E−02 | −3.4426E−11 | −1.0429E−02 |

| Surface # | 7 | 8 | 9 | 10 | 11 |
|---|---|---|---|---|---|
| k = | 2.2536E+00 | −2.0644E+01 | −8.2589E+01 | 6.4809E+01 | 2.9767E+01 |
| A4 = | −3.4732E−02 | −1.5598E−01 | −1.0881E−01 | −9.1990E−02 | −1.1298E−01 |
| A6 = | −1.3205E−03 | 4.2419E−01 | 1.9323E−01 | 1.4797E−01 | 1.3834E−01 |
| A8 = | 1.9021E−02 | −1.3581E+00 | −3.7535E−01 | −5.4784E−02 | −8.5450E−02 |
| A10 = | −6.5942E−02 | 2.1403E+00 | 3.8400E−01 | −2.0530E−03 | 3.6216E−02 |
| A12 = | 4.7626E−02 | −2.0129E+00 | −2.1175E−01 | 5.7973E−03 | −8.1674E−03 |
| A14 = | −1.2843E−02 | 1.0438E+00 | 6.6851E−02 | −1.0455E−03 | 6.6188E−04 |
| A16 = | −2.5380E−12 | −2.2926E−01 | −1.0019E−02 | — | — |

| Surface # | 12 | 13 | 14 | 15 |
|---|---|---|---|---|
| k = | −6.2542E+00 | −2.2861E+00 | −4.7019E+01 | 6.6425E+01 |
| A4 = | −2.0578E−01 | −2.9949E−01 | −3.4828E−01 | −4.8078E−01 |
| A6 = | 2.7083E−02 | 2.0063E−01 | 5.3646E−01 | 6.0017E−01 |
| A8 = | 3.0995E−02 | −1.0770E−01 | −3.7176E−01 | −3.6283E−01 |

TABLE 10-continued

| Aspheric Coefficients | | | | |
|---|---|---|---|---|
| A10 = | −1.4586E−02 | 3.8473E−02 | 1.4006E−01 | 1.2333E−01 |
| A12 = | 9.0016E−04 | −8.4194E−03 | −2.9859E−02 | −2.4119E−02 |
| A14 = | 7.3096E−04 | 9.7877E−04 | 3.3992E−03 | 2.5429E−03 |
| A16 = | −1.2664E−04 | −4.2359E−05 | −1.6066E−04 | −1.1203E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.16 | SD/TD | 0.74 |
| Fno | 1.55 | TL/f | 1.07 |
| HFOV [deg.] | 22.6 | TL/ImgH | 2.41 |
| V7 | 18.7 | f/ImgH | 2.24 |
| ΣVi | 213.9 | f/EPD | 1.55 |
| R1/CT1 | 1.57 | TL/EPD | 1.67 |
| CT1/CT7 | 5.13 | BL/TD | 0.08 |
| T67/CT6 | 3.61 | tan(HFOV) | 0.42 |
| T23/T34 | 0.49 | Yc62/CT6 | 4.95 |
| f/R1 | 2.86 | (R1 × R1)/(f × CT1) | 0.55 |
| f/R12 | 4.09 | T56/(ΣAT − T56) | 0.29 |
| |f/R14| | 0.22 | TL/(EPD + T56) | 1.43 |
| (R13 − R14)/(R13 + R14) | −1.43 | EPD/(ΣCT − CT1) | 2.17 |
| f/f2 | −0.80 | (f × TL)/(EPD × ImgH) | 3.74 |
| f/f7 | −1.01 | — | — |

6th Embodiment

Figure 11:
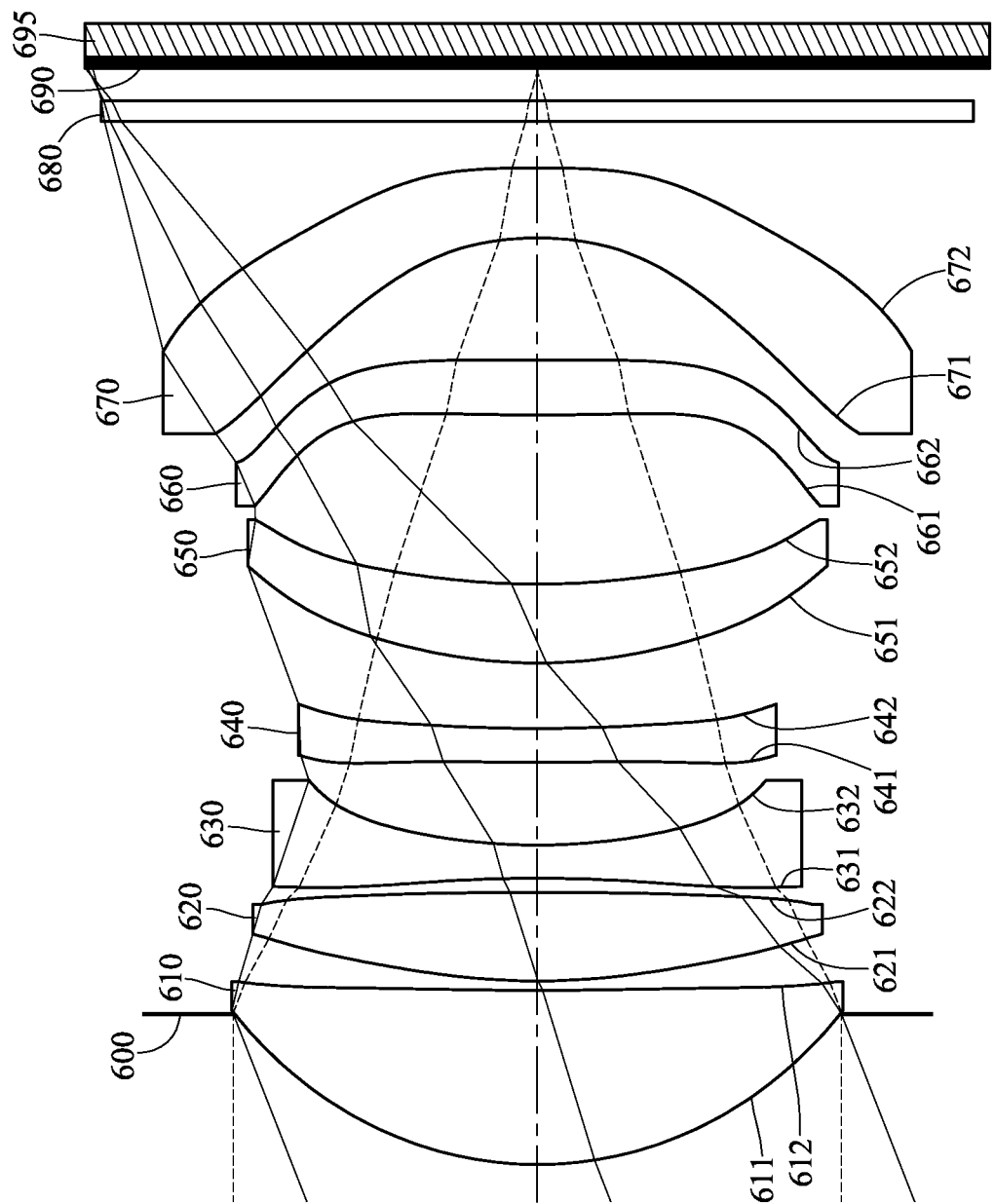
FIG. 11 is a schematic view of an image capturing unit according to the 6th embodiment of the present disclosure.
Figure 12:
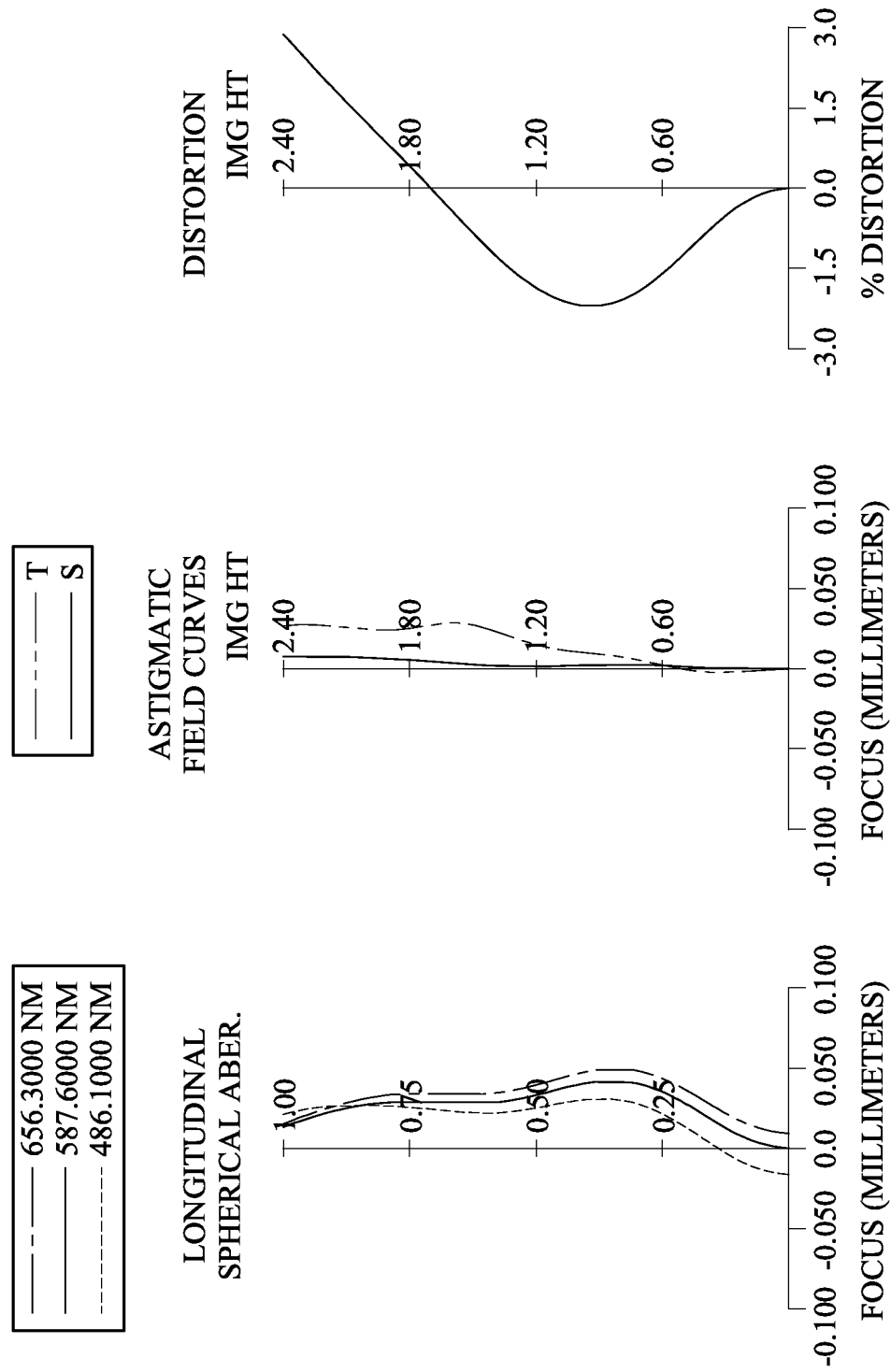
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 695. The optical imaging lens assembly includes, in order from an object side to an image side, an aperture stop 600, a first lens element 610, a second lens element 620, a third lens element 630, a fourth lens element 640, a fifth lens element 650, a sixth lens element 660, a seventh lens element 670, a filter 680 and an image surface 690. The optical imaging lens assembly includes seven lens elements (610, 620, 630, 640, 650, 660 and 670) with no additional lens element disposed between each of the adjacent seven lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The image-side surface 612 of the first lens element 610 has two inflection points.

The second lens element 620 with positive refractive power has an object-side surface 621 being convex in a paraxial region thereof and an image-side surface 622 being convex in a paraxial region thereof. The second lens element 620 is made of glass material and has the object-side surface 621 and the image-side surface 622 being both aspheric. The object-side surface 621 of the second lens element 620 has one inflection point.

The third lens element 630 with negative refractive power has an object-side surface 631 being concave in a paraxial region thereof and an image-side surface 632 being concave in a paraxial region thereof. The third lens element 630 is made of glass material and has the object-side surface 631 and the image-side surface 632 being both aspheric. The object-side surface 631 of the third lens element 630 has two inflection points.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has two inflection points.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has one inflection point.

The sixth lens element 660 with positive refractive power has an object-side surface 661 being convex in a paraxial region thereof and an image-side surface 662 being concave in a paraxial region thereof. The sixth lens element 660 is made of glass material and has the object-side surface 661 and the image-side surface 662 being both aspheric. Each of the object-side surface 661 and the image-side surface 662 of the sixth lens element 660 has two inflection points. The image-side surface 662 of the sixth lens element 660 has at least one critical point.

The seventh lens element 670 with negative refractive power has an object-side surface 671 being concave in a paraxial region thereof and an image-side surface 672 being convex in a paraxial region thereof. The seventh lens element 670 is made of plastic material and has the object-side surface 671 and the image-side surface 672 being both aspheric. The object-side surface 671 of the seventh lens element 670 has one inflection point.

The filter 680 is made of glass material and located between the seventh lens element 670 and the image surface 690, and will not affect the focal length of the optical imaging lens assembly. The image sensor 695 is disposed on or near the image surface 690 of the optical imaging lens assembly.

Among the first lens element 610 through the seventh lens element 670, four lens elements (the first lens element 610, the second lens element 620, the fifth lens element 650 and the sixth lens element 660) have positive refractive power.

When an Abbe number of each of these four lens elements having positive refractive power is Vp, the following condition is satisfied for one (the fifth lens element 650) of these four lens elements: Vp<25.0.

When a minimum value among all maximum effective radii of the object-side surfaces and the image-side surfaces of the seven lens elements is Ymin, a maximum effective radius of the image-side surface 632 of the third lens element 630 is equal to Ymin.

The detailed optical data of the 6th embodiment are shown in Table 11 and the aspheric surface data are shown in Table 12 below.

TABLE 11

6th Embodiment
f = 5.93 mm, Fno = 1.83, HFOV = 21.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.802 | | | | |
| 2 | Lens 1 | 1.967 | (ASP) | 0.930 | Plastic | 1.534 | 55.9 | 3.96 |
| 3 | | 23.690 | (ASP) | 0.050 | | | | |
| 4 | Lens 2 | 3.674 | (ASP) | 0.472 | Glass | 1.487 | 70.2 | 7.33 |
| 5 | | −126.425 | (ASP) | 0.075 | | | | |
| 6 | Lens 3 | −10.746 | (ASP) | 0.178 | Glass | 1.755 | 27.5 | −3.16 |
| 7 | | 3.095 | (ASP) | 0.443 | | | | |
| 8 | Lens 4 | 70.177 | (ASP) | 0.180 | Plastic | 1.669 | 19.5 | −18.11 |
| 9 | | 10.317 | (ASP) | 0.349 | | | | |
| 10 | Lens 5 | 2.633 | (ASP) | 0.421 | Plastic | 1.669 | 19.5 | 10.19 |
| 11 | | 4.015 | (ASP) | 0.902 | | | | |
| 12 | Lens 6 | 9.536 | (ASP) | 0.294 | Glass | 1.755 | 27.5 | 14.95 |
| 13 | | 60.665 | (ASP) | 0.652 | | | | |
| 14 | Lens 7 | −1.685 | (ASP) | 0.373 | Plastic | 1.529 | 45.4 | −3.65 |
| 15 | | −14.204 | (ASP) | 0.250 | | | | |
| 16 | Filter | Plano | | 0.110 | Glass | 1.517 | 64.2 | — |
| 17 | | Plano | | 0.173 | | | | |
| 18 | Image | Plano | | — | | | | |

Note:
Reference wavelength is 587.6 nm (d-line).

TABLE 12

Aspheric Coefficients

| Surface # | 2 | 3 | 4 | 5 | 6 |
|---|---|---|---|---|---|
| k = | −1.8206E−01 | 2.3529E+01 | −1.5019E+01 | 9.0000E+01 | −6.1720E+01 |
| A4 = | −5.0385E−05 | −8.2369E−03 | 2.2467E−02 | −4.6204E−02 | −9.1202E−02 |
| A6 = | 3.3451E−03 | −7.2660E−03 | −2.5431E−02 | 4.6170E−02 | 1.9498E−01 |
| A8 = | −2.1918E−03 | 9.4236E−03 | −6.9536E−03 | −7.2326E−03 | −1.7582E−01 |
| A10 = | 5.8412E−04 | −3.1218E−03 | 2.6764E−02 | −1.7461E−02 | 8.9495E−02 |
| A12 = | −5.0646E−05 | 3.7431E−04 | −1.5292E−02 | 1.2986E−02 | −2.4155E−02 |
| A14 = | — | — | 3.4390E−03 | −3.9244E−03 | 2.6070E−03 |
| A16 = | — | — | −2.7422E−04 | 4.5503E−04 | — |

| Surface # | 7 | 8 | 9 | 10 | 11 |
|---|---|---|---|---|---|
| k = | −1.6757E+01 | 2.6611E+00 | −2.6063E+01 | −9.3002E−02 | 3.3337E−01 |
| A4 = | 1.7638E−02 | 4.7200E−02 | 6.5643E−02 | −2.1662E−02 | −2.5604E−02 |
| A6 = | 5.5521E−02 | −2.2380E−01 | −2.2127E−01 | −1.3741E−02 | 1.0987E−02 |
| A8 = | −3.1786E−02 | 2.5627E−01 | 2.8019E−02 | −4.1118E−03 |
| A10 = | −9.3148E−03 | −1.0974E−01 | −1.2780E−01 | −9.7175E−03 | 9.8497E−03 |
| A12 = | 2.8710E−02 | 1.7724E−02 | 2.1793E−02 | 9.5946E−04 | −3.1713E−03 |
| A14 = | −8.0720E−03 | −2.2628E−04 | −2.4710E−04 | — | — |

| Surface # | 12 | 13 | 14 | 15 |
|---|---|---|---|---|
| k = | −7.7551E+00 | −2.5409E+00 | −8.0953E+00 | −2.6636E+01 |
| A4 = | −5.4423E−02 | −5.6977E−02 | −4.1539E−01 | −3.7458E−01 |
| A6 = | −4.9967E−02 | −4.9032E−02 | 2.9647E−01 | 2.9957E−01 |
| A8 = | 3.8939E−02 | 4.7407E−02 | −3.9602E−02 | −1.2617E−01 |
| A10 = | −3.2849E−02 | −3.5899E−02 | −7.4956E−02 | 3.2827E−02 |
| A12 = | 9.5897E−03 | 1.2306E−02 | 5.0024E−02 | −6.0445E−03 |
| A14 = | −3.1966E−04 | −1.6989E−03 | −1.2702E−02 | 7.8153E−04 |
| A16 = | — | 1.6244E−04 | 1.1998E−03 | −5.1934E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.93 | SD/TD | 0.85 |
| Fno | 1.83 | TL/f | 0.99 |
| HFOV [deg.] | 21.3 | TL/ImgH | 2.44 |
| V7 | 45.4 | f/ImgH | 2.47 |
| ΣVi | 265.5 | f/EPD | 1.83 |
| R1/CT1 | 2.12 | TL/EPD | 1.81 |
| CT1/CT7 | 2.49 | BL/TD | 0.10 |
| T67/CT6 | 2.22 | tan(HFOV) | 0.39 |
| T23/T34 | 0.17 | Yc62/CT6 | 0.88 |
| f/R1 | 3.01 | (R1 × R1)/(f × CT1) | 0.70 |
| f/R12 | 0.10 | T56/(ΣAT − T56) | 0.57 |
| |f/R14| | 0.42 | TL/(EPD + T56) | 1.41 |
| (R13 − R14)/(R13 + R14) | −0.79 | EPD/(ΣCT − CT1) | 1.69 |
| f/f2 | 0.81 | (f × TL)/(EPD × ImgH) | 4.47 |
| f/f7 | −1.62 | — | — |

Figure 13:
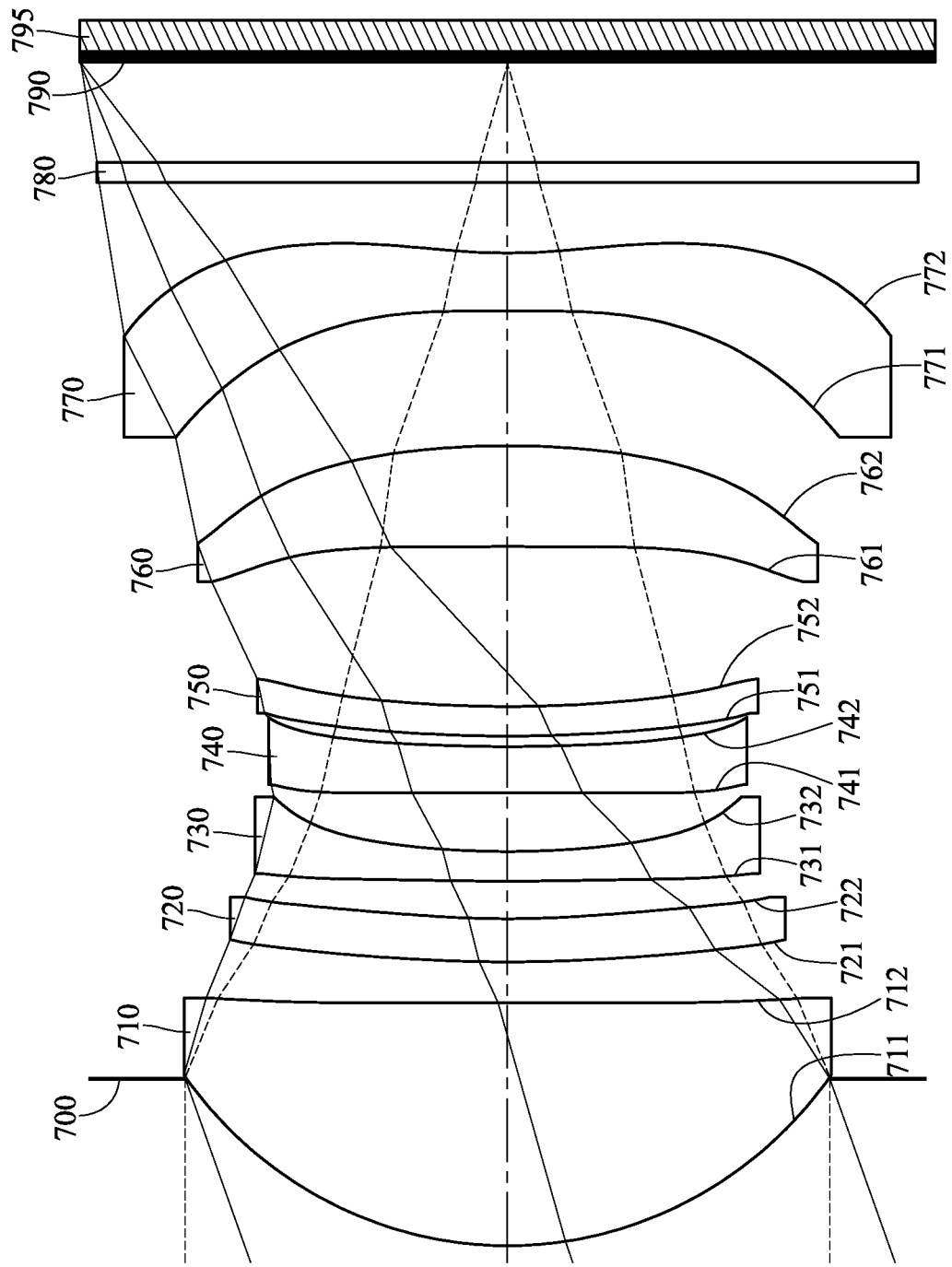
FIG. 13 is a schematic view of an image capturing unit according to the 7th embodiment of the present disclosure.
Figure 14:
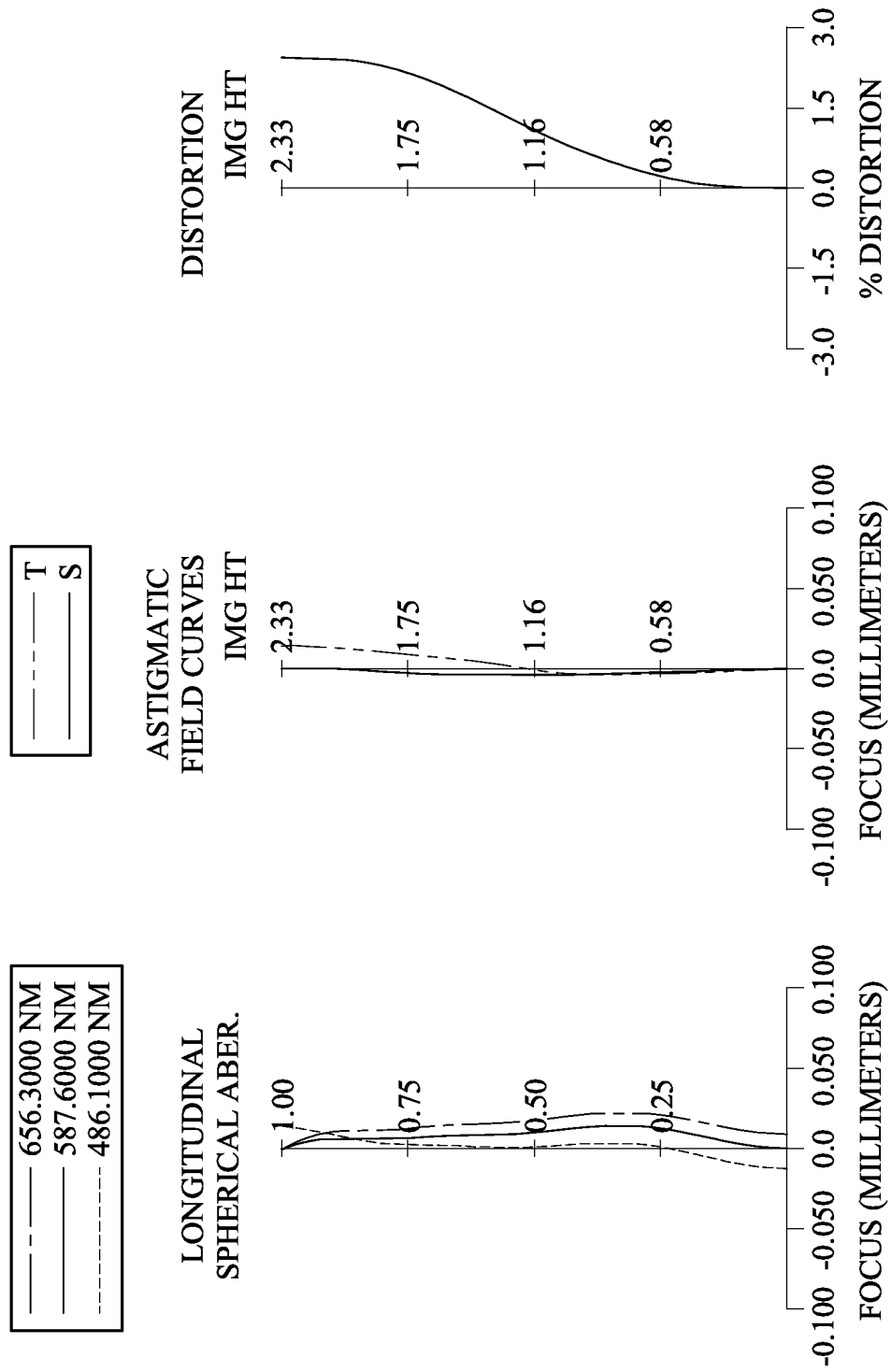
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 795. The optical imaging lens assembly includes, in order from an object side to an image side, an aperture stop 700, a first lens element 710, a second lens element 720, a third lens element 730, a fourth lens element 740, a fifth lens element 750, a sixth lens element 760, a seventh lens element 770, a filter 780 and an image surface 790. The optical imaging lens assembly includes seven lens elements (710, 720, 730, 740, 750, 760 and 770) with no additional lens element disposed between each of the adjacent seven lens elements.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric. The image-side surface 712 of the first lens element 710 has one inflection point.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens is made of plastic material and has the object-side surface 731 and the image-side surface 732 being both aspheric. The object-side surface 731 of the third lens element 730 has three inflection points.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has three inflection points.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has one inflection point.

The sixth lens element 760 with positive refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. Each of the object-side surface 761 and the image-side surface 762 of the sixth lens element 760 has one inflection point.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. Each of the object-side surface 771 and the image-side surface 772 of the seventh lens element 770 has one inflection point.

The filter 780 is made of glass material and located between the seventh lens element 770 and the image surface 790, and will not affect the focal length of the optical imaging lens assembly. The image sensor 795 is disposed on or near the image surface 790 of the optical imaging lens assembly.

Among the first lens element 710 through the seventh lens element 770, two lens elements (the first lens element 710 and the sixth lens element 760) have positive refractive power. When an Abbe number of each of these two lens elements having positive refractive power is Vp, the following condition is satisfied for one (the sixth lens element 760) of these two lens elements: Vp<25.0.

When a minimum value among all maximum effective radii of the object-side surfaces and the image-side surfaces of the seven lens elements is Ymin, a maximum effective radius of the image-side surface 732 of the third lens element 730 is equal to Ymin.

The detailed optical data of the 7th embodiment are shown in Table 13 and the aspheric surface data are shown in Table 14 below.

TABLE 13

7th Embodiment
f = 6.39 mm, Fno = 1.82, HFOV = 19.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.909 | | | | |
| 2 | Lens 1 | 2.095 | (ASP) | 1.325 | Plastic | 1.534 | 55.9 | 3.86 |
| 3 | | −94.432 | (ASP) | 0.223 | | | | |
| 4 | Lens 2 | 7.856 | (ASP) | 0.235 | Plastic | 1.660 | 20.4 | −27.73 |
| 5 | | 5.431 | (ASP) | 0.205 | | | | |
| 6 | Lens 3 | 18.305 | (ASP) | 0.161 | Plastic | 1.695 | 17.7 | −9.53 |
| 7 | | 4.845 | (ASP) | 0.320 | | | | |
| 8 | Lens 4 | 63.136 | (ASP) | 0.253 | Plastic | 1.688 | 18.7 | −14.76 |
| 9 | | 8.732 | (ASP) | 0.057 | | | | |
| 10 | Lens 5 | 7.183 | (ASP) | 0.161 | Plastic | 1.695 | 17.7 | −167.42 |
| 11 | | 6.704 | (ASP) | 0.873 | | | | |
| 12 | Lens 6 | −312.500 | (ASP) | 0.549 | Plastic | 1.688 | 18.7 | 7.18 |
| 13 | | −4.869 | (ASP) | 0.735 | | | | |
| 14 | Lens 7 | 89.286 | (ASP) | 0.316 | Plastic | 1.529 | 45.4 | −5.65 |
| 15 | | 2.887 | (ASP) | 0.386 | | | | |
| 16 | Filter | Plano | | 0.110 | Glass | 1.517 | 64.2 | — |
| 17 | | Plano | | 0.545 | | | | |
| 18 | Image | Plano | | — | | | | |

Note:
Reference wavelength is 587.6 nm (d-line).

TABLE 14

Aspheric Coefficients

| Surface # | 2 | 3 | 4 | 5 | 6 |
|---|---|---|---|---|---|
| k = | −1.7362E−01 | −9.0000E+01 | −6.7460E+01 | −4.1429E+01 | −6.1720E+01 |
| A4 = | 3.8170E−04 | 4.5427E−03 | −9.5630E−03 | −1.1446E−02 | −1.5957E−02 |
| A6 = | 1.0044E−03 | 2.3914E−03 | 7.8842E−03 | −2.9957E−02 | −4.5981E−02 |
| A8 = | −4.3383E−04 | −7.1639E−04 | 3.9243E−03 | 6.6998E−02 | 1.2702E−01 |
| A10 = | 1.6118E−04 | −1.6157E−04 | 1.2498E−03 | −4.2177E−02 | −1.2083E−01 |
| A12 = | −1.2772E−05 | 5.7782E−05 | −7.3930E−03 | 5.1685E−04 | 5.4741E−02 |
| A14 = | — | — | 4.0396E−03 | 7.9096E−03 | −9.7476E−03 |
| A16 = | — | — | −6.3294E−04 | −1.9271E−03 | — |

| Surface # | 7 | 8 | 9 | 10 | 11 |
|---|---|---|---|---|---|
| k = | −2.2783E+01 | 2.5645E+00 | −2.8709E+01 | 2.4541E+00 | −7.6453E−01 |
| A4 = | 2.6746E−02 | −4.8283E−02 | −6.9702E−02 | −4.4539E−02 | −1.2170E−03 |
| A6 = | −3.5181E−02 | 9.6039E−02 | 1.9342E−01 | 6.7099E−02 | −2.4544E−02 |
| A8 = | 1.1400E−01 | −9.5603E−02 | −1.9463E−01 | −4.2421E−02 | 3.8678E−02 |
| A10 = | −1.2446E−01 | 5.0627E−02 | 9.5142E−02 | 1.0635E−02 | −1.2949E−02 |
| A12 = | 7.5083E−02 | −4.0517E−03 | −1.8223E−02 | — | — |
| A14 = | −1.7299E−02 | −2.8957E−03 | 9.4324E−04 | — | — |

| Surface # | 12 | 13 | 14 | 15 |
|---|---|---|---|---|
| k = | 7.4649E+01 | −2.5409E+00 | −8.0953E+00 | −2.5493E+01 |
| A4 = | −1.5054E−02 | −1.7423E−02 | −2.1383E−01 | −1.1508E−01 |
| A6 = | −1.3138E−02 | −1.7187E−03 | 1.8440E−01 | 8.5021E−02 |
| A8 = | 8.5432E−03 | −1.8568E−03 | −1.2539E−01 | −4.9411E−02 |
| A10 = | −9.2487E−03 | −3.1682E−03 | 5.6104E−02 | 1.8211E−02 |
| A12 = | 4.3017E−03 | 2.5942E−03 | −1.6013E−02 | −4.1707E−03 |
| A14 = | −5.9310E−04 | −7.8345E−04 | 2.6405E−03 | 5.3489E−04 |
| A16 = | — | 1.0427E−04 | −1.9025E−04 | −2.9397E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| | 7th Embodiment | | |
|---|---|---|---|
| f [mm] | 6.39 | SD/TD | 0.83 |
| Fno | 1.82 | TL/f | 1.01 |
| HFOV [deg.] | 19.6 | TL/ImgH | 2.77 |
| V7 | 45.4 | f/ImgH | 2.74 |
| ΣVi | 194.5 | f/EPD | 1.82 |
| R1/CT1 | 1.58 | TL/EPD | 1.84 |
| CT1/CT7 | 4.19 | BL/TD | 0.19 |
| T67/CT6 | 1.34 | tan(HFOV) | 0.37 |
| T23/T34 | 0.64 | Yc62/CT6 | — |

-continued

7th Embodiment

| | | | |
|---|---|---|---|
| f/R1 | 3.05 | (R1 × R1)/(f × CT1) | 0.52 |
| f/R12 | −1.31 | T56/(ΣAT − T56) | 0.57 |
| |f/R14| | 2.21 | TL/(EPD + T56) | 1.47 |
| (R13 − R14)/(R13 + R14) | 0.94 | EPD/(ΣCT − CT1) | 2.10 |
| f/f2 | −0.23 | (f × TL)/(EPD × ImgH) | 5.04 |
| f/f7 | −1.13 | — | — |

8th Embodiment

Figure 15:
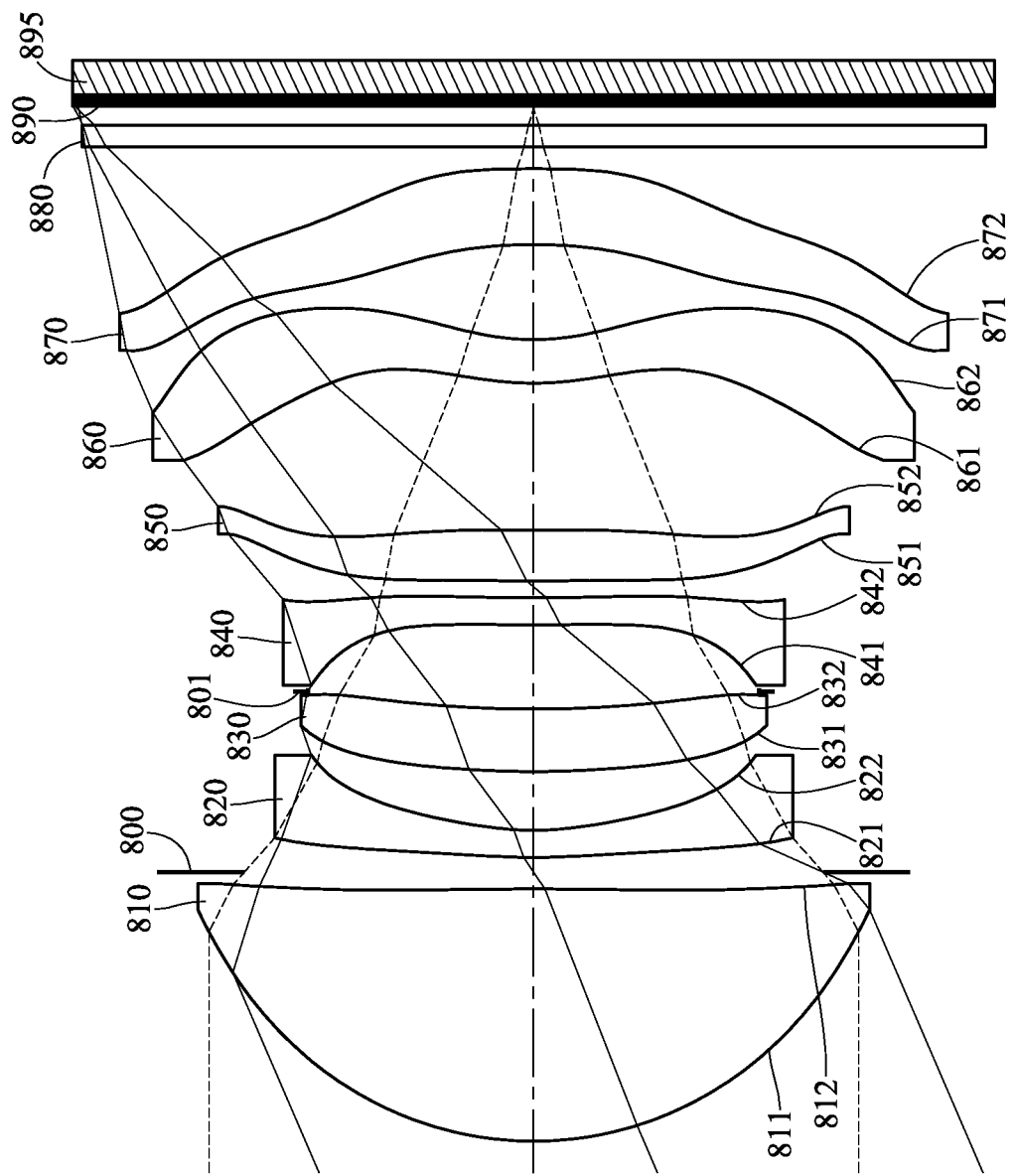
FIG. 15 is a schematic view of an image capturing unit according to the 8th embodiment of the present disclosure.
Figure 16:
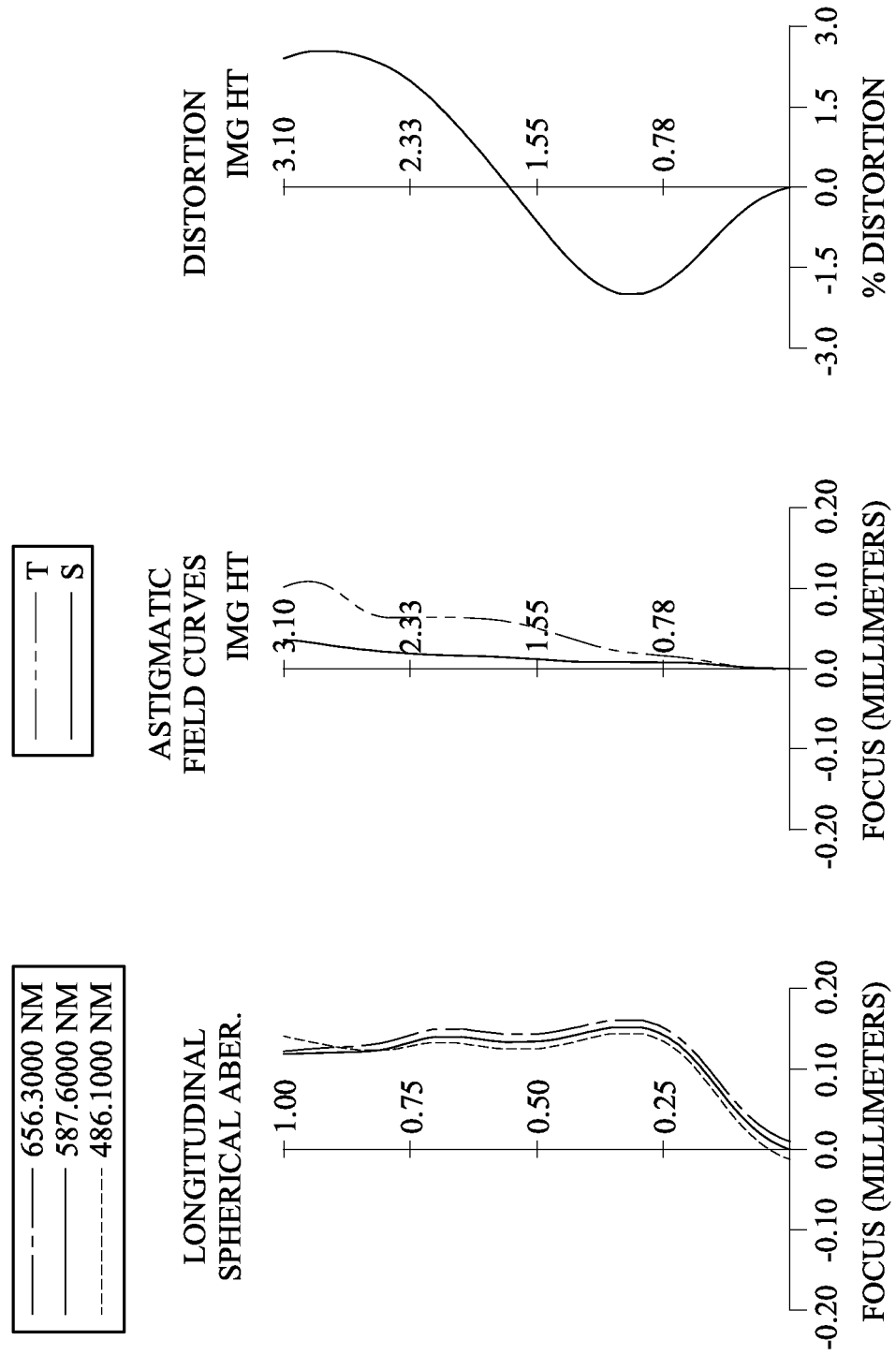
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 895. The optical imaging lens assembly includes, in order from an object side to an image side, a first lens element 810, an aperture stop 800, a second lens element 820, a third lens element 830, a stop 801, a fourth lens element 840, a fifth lens element 850, a sixth lens element 860, a seventh lens element 870, a filter 880 and an image surface 890. The optical imaging lens assembly includes seven lens elements (810, 820, 830, 840, 850, 860 and 870) with no additional lens element disposed between each of the adjacent seven lens elements.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric. The image-side surface 812 of the first lens element 810 has one inflection point.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has two inflection points.

The third lens element 830 with positive refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The image-side surface 832 of the third lens element 830 has one inflection point.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has one inflection point. The image-side surface 842 of the fourth lens element 840 has two inflection points.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has three inflection points. The image-side surface 852 of the fifth lens element 850 has two inflection points.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The object-side surface 861 of the sixth lens element 860 has three inflection points. The image-side surface 862 of the sixth lens element 860 has two inflection points. The image-side surface 862 of the sixth lens element 860 has at least one critical point.

The seventh lens element 870 with negative refractive power has an object-side surface 871 being concave in a paraxial region thereof and an image-side surface 872 being convex in a paraxial region thereof. The seventh lens element 870 is made of plastic material and has the object-side surface 871 and the image-side surface 872 being both aspheric. Each of the object-side surface 871 and the image-side surface 872 of the seventh lens element 870 has three inflection points.

The filter 880 is made of glass material and located between the seventh lens element 870 and the image surface 890, and will not affect the focal length of the optical imaging lens assembly. The image sensor 895 is disposed on or near the image surface 890 of the optical imaging lens assembly.

Among the first lens element 810 through the seventh lens element 870, three lens elements (the first lens element 810, the third lens element 830 and the fifth lens element 850) have positive refractive power. When an Abbe number of each of these three lens elements having positive refractive power is Vp, the following condition is satisfied for two (the third lens element 830 and the fifth lens element 850) of these three lens elements: Vp<25.0.

When a minimum value among all maximum effective radii of the object-side surfaces and the image-side surfaces of the seven lens elements is Ymin, a maximum effective radius of the object-side surface 841 of the fourth lens element 840 is equal to Ymin.

The detailed optical data of the 8th embodiment are shown in Table 15 and the aspheric surface data are shown in Table 16 below.

TABLE 15

8th Embodiment
f = 6.86 mm, Fno = 1.57, HFOV = 23.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.307 (ASP) | 1.699 | Plastic | 1.545 | 56.1 | 4.00 |

TABLE 15-continued

8th Embodiment
f = 6.86 mm, Fno = 1.57, HFOV = 23.3 deg.

| Surface # | | Curvature Radius | | Thickness | Material | Index | Abbe # | Focal Length |
|---|---|---|---|---|---|---|---|---|
| 2 | | −29.740 | (ASP) | 0.113 | | | | |
| 3 | Ape. Stop | Plano | | 0.100 | | | | |
| 4 | Lens 2 | 4.324 | (ASP) | 0.183 | Plastic | 1.669 | 19.5 | −5.99 |
| 5 | | 2.045 | (ASP) | 0.396 | | | | |
| 6 | Lens 3 | 6.819 | (ASP) | 0.420 | Plastic | 1.639 | 23.5 | 67.13 |
| 7 | | 7.914 | (ASP) | 0.117 | | | | |
| 8 | Stop | Plano | | 0.452 | | | | |
| 9 | Lens 4 | 38.854 | (ASP) | 0.180 | Plastic | 1.639 | 23.5 | −29.70 |
| 10 | | 12.723 | (ASP) | 0.113 | | | | |
| 11 | Lens 5 | 14.862 | (ASP) | 0.346 | Plastic | 1.688 | 18.7 | 18.87 |
| 12 | | −101.516 | (ASP) | 0.987 | | | | |
| 13 | Lens 6 | 2.041 | (ASP) | 0.293 | Plastic | 1.544 | 55.9 | −15.51 |
| 14 | | 1.560 | (ASP) | 0.641 | | | | |
| 15 | Lens 7 | −3.393 | (ASP) | 0.510 | Plastic | 1.688 | 18.7 | −6.57 |
| 16 | | −14.468 | (ASP) | 0.150 | | | | |
| 17 | Filter | Plano | | 0.145 | Glass | 1.517 | 64.2 | — |
| 18 | | Plano | | 0.128 | | | | |
| 19 | Image | Plano | | — | | | | |

Note:
Reference wavelength is 587.6 nm (d-line).
An effective radius of the stop 801 (Surface 8) is 1.517 mm.

TABLE 16

Aspheric Coefficients

| Surface # | 1 | 2 | 4 | 5 | 6 |
|---|---|---|---|---|---|
| k = | −2.4349E−01 | −7.1074E+01 | −8.3221E+01 | −1.0974E+01 | 1.0323E+00 |
| A4 = | 1.8381E−04 | 5.0699E−03 | −7.2283E−02 | −5.0437E−02 | −2.1641E−02 |
| A6 = | 1.5589E−03 | 7.2983E−03 | 9.4348E−02 | 9.4688E−02 | 2.7527E−02 |
| A8 = | −6.2796E−04 | −5.3385E−03 | −6.2117E−02 | −5.2925E−02 | −5.0228E−03 |
| A10 = | 1.6691E−04 | 1.6028E−03 | 2.2832E−02 | 1.4449E−02 | −3.2999E−03 |
| A12 = | −1.4584E−05 | −2.3253E−04 | −4.3188E−03 | −7.8530E−04 | 2.1355E−03 |
| A14 = | — | 1.3419E−05 | 3.2848E−04 | 6.4354E−08 | −2.6728E−04 |

| Surface # | 7 | 9 | 10 | 11 | 12 |
|---|---|---|---|---|---|
| k = | 7.6871E+00 | −3.8499E+00 | −8.2589E+01 | 4.5136E+01 | −5.2935E+01 |
| A4 = | −9.7771E−03 | −2.6212E−02 | −3.2120E−02 | −7.5470E−02 | −7.0480E−02 |
| A6 = | 7.0858E−03 | −5.0726E−02 | 2.5092E−02 | 8.0588E−02 | 5.5500E−02 |
| A8 = | 2.4163E−03 | 3.0189E−02 | −5.8777E−02 | −3.2961E−02 | −1.9525E−02 |
| A10 = | −6.4790E−03 | −3.3332E−02 | 5.9311E−02 | 7.2988E−03 | 5.0593E−03 |
| A12 = | 2.3734E−03 | 3.0469E−02 | −2.8469E−02 | −8.1343E−04 | −7.8712E−04 |
| A14 = | −3.0344E−04 | −1.3608E−02 | 6.7903E−03 | 2.8196E−05 | 4.6972E−05 |
| A16 = | 1.6125E−08 | 2.1884E−03 | −6.4499E−04 | — | — |

| Surface # | 13 | 14 | 15 | 16 |
|---|---|---|---|---|
| k = | −6.0377E+00 | −2.0587E+00 | −3.9112E+01 | −3.4406E+01 |
| A4 = | −1.0313E−01 | −1.3053E−01 | −1.6300E−01 | −2.5810E−01 |
| A6 = | −2.2255E−02 | 1.7678E−02 | 1.3614E−01 | 1.7304E−01 |
| A8 = | 2.1640E−02 | 1.2143E−02 | −5.0711E−02 | −5.5964E−02 |
| A10 = | −3.2397E−03 | −7.0117E−03 | 1.0352E−02 | 1.0378E−02 |
| A12 = | −5.3545E−04 | 1.5980E−03 | −1.2430E−03 | −1.1605E−03 |
| A14 = | 1.8216E−04 | −1.7804E−04 | 8.3892E−05 | 7.4008E−05 |
| A16 = | −1.2919E−05 | 7.9138E−06 | −2.4550E−06 | −2.0657E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 6.86 | SD/TD | 0.72 |
| Fno | 1.57 | TL/f | 1.02 |
| HFOV [deg.] | 23.3 | TL/ImgH | 2.25 |
| V7 | 18.7 | f/ImgH | 2.21 |
| ΣVi | 215.8 | f/EPD | 1.57 |
| R1/CT1 | 1.36 | TL/EPD | 1.60 |
| CT1/CT7 | 3.33 | BL/TD | 0.06 |

-continued

| 8th Embodiment | | | |
|---|---|---|---|
| T67/CT6 | 2.19 | tan(HFOV) | 0.43 |
| T23/T34 | 0.70 | Yc62/CT6 | 4.57 |
| f/R1 | 2.97 | (R1 × R1)/(f × CT1) | 0.46 |
| f/R12 | 4.40 | T56/(ΣAT − T56) | 0.51 |
| |f/R14| | 0.47 | TL/(EPD + T56) | 1.30 |
| (R13 − R14)/(R13 + R14) | −0.62 | EPD/(ΣCT − CT1) | 2.26 |
| f/f2 | −1.14 | (f × TL)/(EPD × ImgH) | 3.53 |
| f/f7 | −1.05 | — | — |

9th Embodiment

Figure 17:
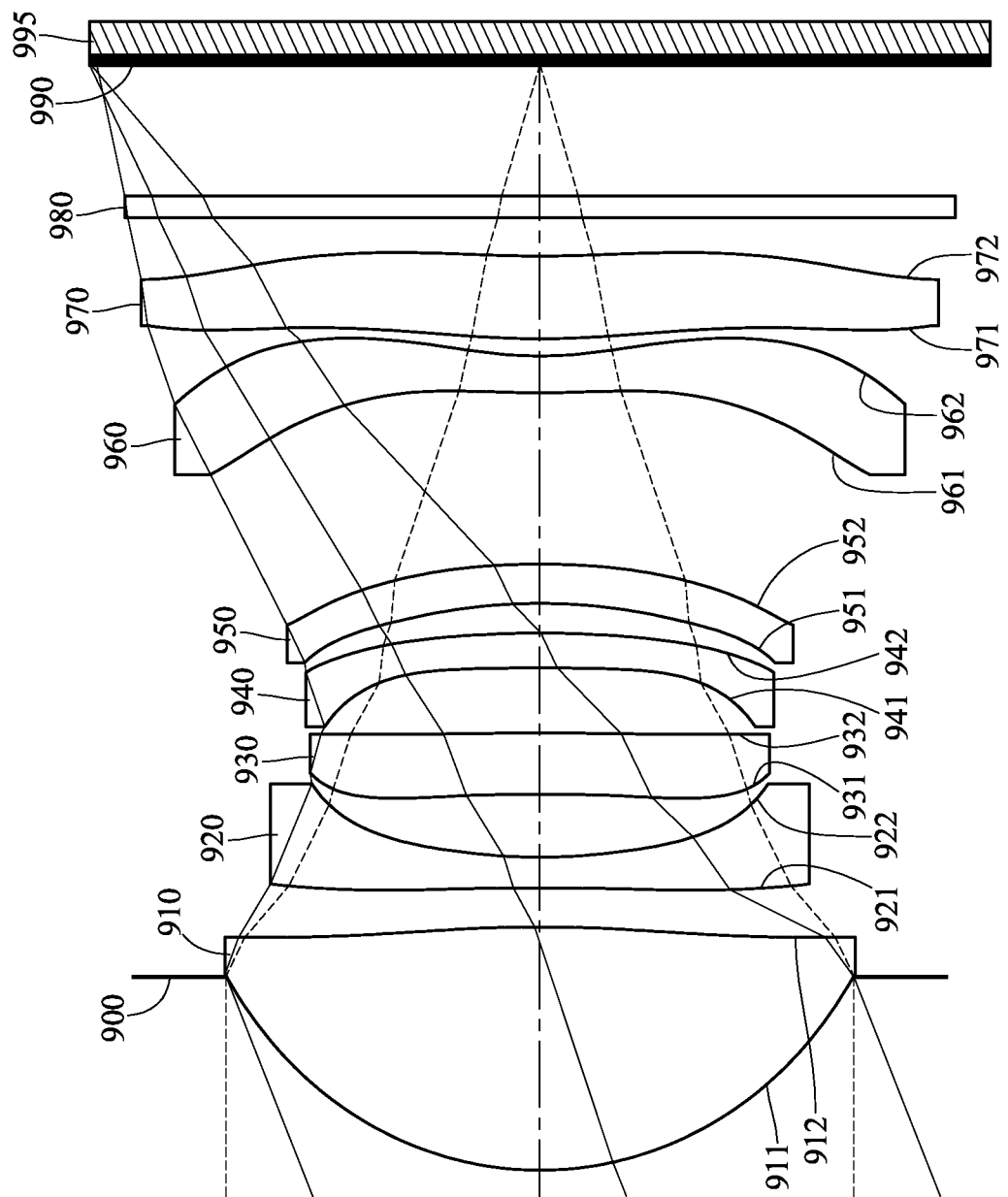
FIG. 17 is a schematic view of an image capturing unit according to the 9th embodiment of the present disclosure.
Figure 18:
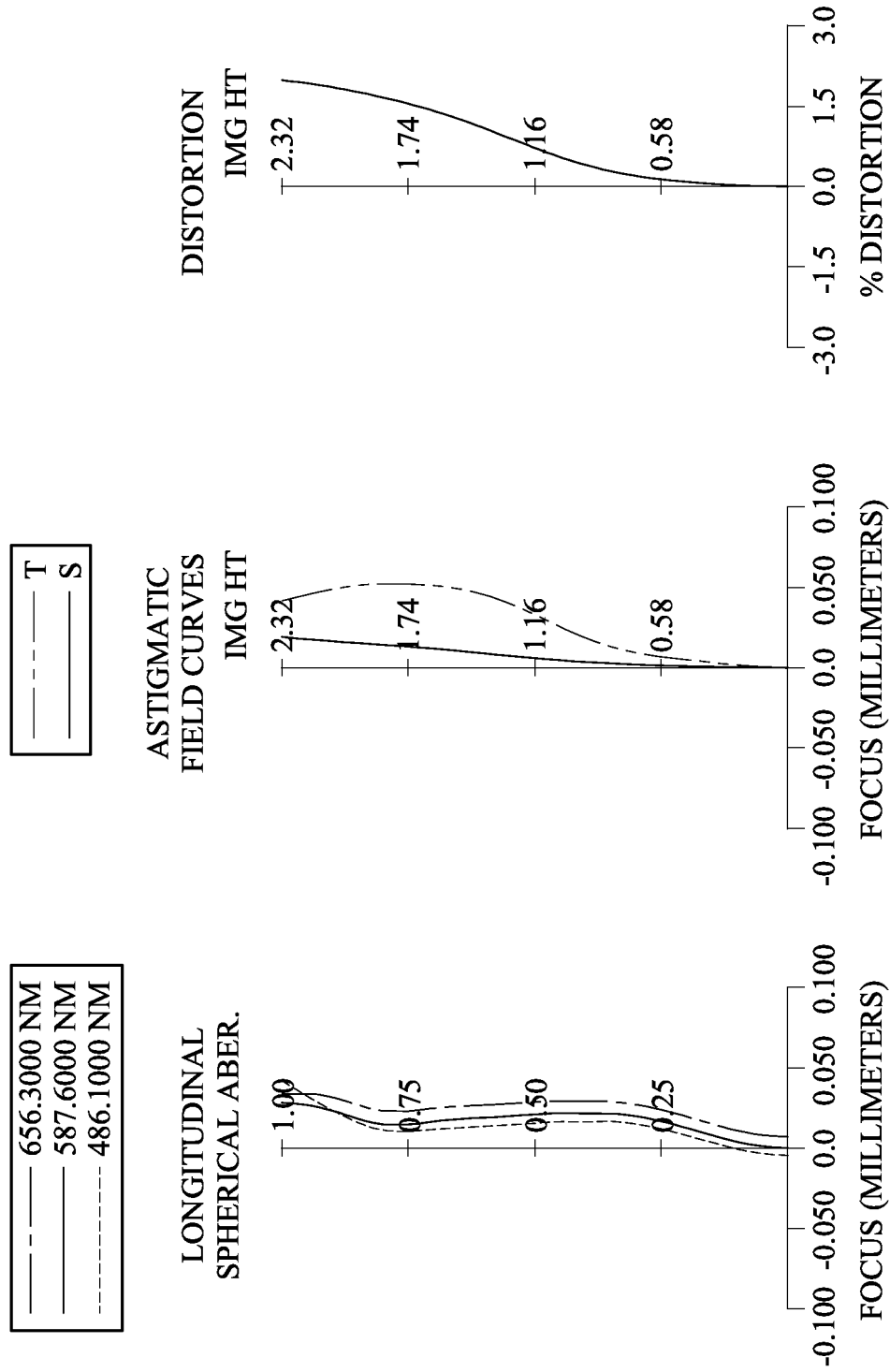
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens assembly (its reference numeral is omitted) of the present disclosure and an image sensor 995. The optical imaging lens assembly includes, in order from an object side to an image side, an aperture stop 900, a first lens element 910, a second lens element 920, a third lens element 930, a fourth lens element 940, a fifth lens element 950, a sixth lens element 960, a seventh lens element 970, a filter 980 and an image surface 990. The optical imaging lens assembly includes seven lens elements (910, 920, 930, 940, 950, 960 and 970) with no additional lens element disposed between each of the adjacent seven lens elements.

The first lens element 910 with positive refractive power has an object-side surface 911 being convex in a paraxial region thereof and an image-side surface 912 being convex in a paraxial region thereof. The first lens element 910 is made of glass material and has the object-side surface 911 and the image-side surface 912 being both aspheric. The image-side surface 912 of the first lens element 910 has one inflection point.

The second lens element 920 with negative refractive power has an object-side surface 921 being concave in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has one inflection point.

The third lens element 930 with negative refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric. The object-side surface 931 of the third lens element 930 has one inflection point. The image-side surface 932 of the third lens element 930 has three inflection points.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The image-side surface 952 of the fifth lens element 950 has one inflection point.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has two inflection points. The image-side surface 962 of the sixth lens element 960 has one inflection point. The image-side surface 962 of the sixth lens element 960 has at least one critical point.

The seventh lens element 970 with positive refractive power has an object-side surface 971 being convex in a paraxial region thereof and an image-side surface 972 being concave in a paraxial region thereof. The seventh lens element 970 is made of plastic material and has the object-side surface 971 and the image-side surface 972 being both aspheric. The object-side surface 971 of the seventh lens element 970 has three inflection points. The image-side surface 972 of the seventh lens element 970 has two inflection points.

The filter 980 is made of glass material and located between the seventh lens element 970 and the image surface 990, and will not affect the focal length of the optical imaging lens assembly. The image sensor 995 is disposed on or near the image surface 990 of the optical imaging lens assembly.

Among the first lens element 910 through the seventh lens element 970, three lens elements (the first lens element 910, the fourth lens element 940 and the seventh lens element 970) have positive refractive power. When an Abbe number of each of these three lens elements having positive refractive power is Vp, the following condition is satisfied for two (the fourth lens element 940 and the seventh lens element 970) of these three lens elements: Vp<25.0.

When a minimum value among all maximum effective radii of the object-side surfaces and the image-side surfaces of the seven lens elements is Ymin, a maximum effective radius of the object-side surface 941 of the fourth lens element 940 is equal to Ymin.

The detailed optical data of the 9th embodiment are shown in Table 17 and the aspheric surface data are shown in Table 18 below.

TABLE 17

9th Embodiment
f = 5.76 mm, Fno = 1.78, HFOV = 21.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.999 | | | | |
| 2 | Lens 1 | 1.732 | (ASP) | 1.256 | Glass | 1.518 | 63.5 | 2.81 |
| 3 | | −6.768 | (ASP) | 0.200 | | | | |
| 4 | Lens 2 | −104.728 | (ASP) | 0.160 | Plastic | 1.614 | 26.0 | −4.24 |
| 5 | | 2.673 | (ASP) | 0.326 | | | | |
| 6 | Lens 3 | −9.714 | (ASP) | 0.315 | Plastic | 1.582 | 30.2 | −24.48 |
| 7 | | −30.847 | (ASP) | 0.336 | | | | |
| 8 | Lens 4 | −19.415 | (ASP) | 0.180 | Plastic | 1.639 | 23.5 | 12.45 |
| 9 | | −5.661 | (ASP) | 0.153 | | | | |
| 10 | Lens 5 | −3.234 | (ASP) | 0.203 | Plastic | 1.669 | 19.5 | −20.07 |
| 11 | | −4.368 | (ASP) | 0.885 | | | | |
| 12 | Lens 6 | 5.136 | (ASP) | 0.190 | Plastic | 1.511 | 56.8 | −6.19 |
| 13 | | 1.933 | (ASP) | 0.089 | | | | |
| 14 | Lens 7 | 3.983 | (ASP) | 0.427 | Plastic | 1.669 | 19.5 | 16.56 |
| 15 | | 5.951 | (ASP) | 0.200 | | | | |
| 16 | Filter | Plano | | 0.110 | Glass | 1.517 | 64.2 | — |
| 17 | | Plano | | 0.673 | | | | |
| 18 | Image | Plano | | — | | | | |

Note:
Reference wavelength is 587.6 nm (d-line).

TABLE 18

Aspheric Coefficients

| Surface # | 2 | 3 | 4 | 5 | 6 |
|---|---|---|---|---|---|
| k = | −2.0746E−01 | −4.5914E+01 | 9.0000E+01 | −1.1073E+01 | 2.2891E+00 |
| A4 = | −8.2364E−04 | 8.0345E−03 | −1.3700E−01 | −1.2245E−01 | −3.4585E−02 |
| A6 = | 5.1665E−03 | 2.7901E−02 | 3.6722E−01 | 3.7536E−01 | 1.2019E−01 |
| A8 = | −4.2423E−03 | −3.3501E−02 | −4.1742E−01 | −3.3932E−01 | −1.9708E−02 |
| A10 = | 2.0452E−03 | 1.8529E−02 | 2.5868E−01 | 1.6509E−01 | −3.5019E−02 |
| A12 = | −3.3624E−04 | −5.2649E−03 | −8.4844E−02 | −2.3462E−02 | 2.6237E−02 |
| A14 = | — | 6.1203E−04 | 1.1549E−02 | — | −1.4625E−03 |

| Surface # | 7 | 8 | 9 | 10 | 11 |
|---|---|---|---|---|---|
| k = | −9.0000E+01 | 4.5884E+01 | 1.9482E+01 | 5.7152E+00 | 9.0187E+00 |
| A4 = | −9.8184E−03 | −2.9792E−02 | 3.3285E−02 | −9.1490E−02 | −1.2016E−01 |
| A6 = | 2.4530E−02 | −2.9388E−01 | −1.4909E−01 | 2.9311E−01 | 2.3080E−01 |
| A8 = | 4.4244E−02 | 5.3268E−01 | 3.4810E−01 | −2.8218E−01 | −2.5641E−01 |
| A10 = | −7.6333E−02 | −7.0935E−01 | −4.5788E−01 | 1.5473E−01 | 1.8314E−01 |
| A12 = | 2.8412E−02 | 4.8042E−01 | 2.8896E−01 | −7.2750E−02 | −8.4681E−02 |
| A14 = | −5.7461E−04 | −1.3189E−01 | −6.7195E−02 | 2.1470E−02 | 1.8956E−02 |
| A16 = | — | 7.2341E−05 | 9.2246E−06 | — | — |

| Surface # | 12 | 13 | 14 | 15 |
|---|---|---|---|---|
| k = | −5.0000E+01 | −2.3093E+00 | −1.3626E+01 | −2.1553E+01 |
| A4 = | −2.2512E−01 | −2.5697E−01 | −1.0498E−01 | −1.2316E−01 |
| A6 = | 1.0410E−01 | 1.6309E−01 | 9.5040E−02 | 1.0434E−01 |
| A8 = | 7.9086E−03 | −6.5277E−02 | −6.2430E−02 | −6.3984E−02 |
| A10 = | −3.6112E−02 | 1.2194E−02 | 2.5491E−02 | 2.4582E−02 |
| A12 = | 1.6869E−02 | −1.9562E−04 | −5.9930E−03 | −5.5156E−03 |
| A14 = | −3.2125E−03 | −2.5820E−04 | 7.5543E−04 | 6.7085E−04 |
| A16 = | 2.2500E−04 | 2.6762E−05 | −3.9951E−05 | −3.4433E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| | 9th Embodiment | | |
|---|---|---|---|
| f [mm] | 5.76 | SD/TD | 0.79 |
| Fno | 1.78 | TL/f | 0.99 |
| HFOV [deg.] | 21.5 | TL/ImgH | 2.46 |
| V7 | 19.5 | f/ImgH | 2.48 |
| ΣVi | 238.9 | f/EPD | 1.78 |
| R1/CT1 | 1.38 | TL/EPD | 1.76 |
| CT1/CT7 | 2.94 | BL/TD | 0.21 |
| T67/CT6 | 0.47 | tan(HFOV) | 0.39 |
| T23/T34 | 0.97 | Yc62/CT6 | 5.16 |

| 9th Embodiment | | | |
|---|---|---|---|
| f/R1 | 3.33 | (R1 × R1)/(f × CT1) | 0.41 |
| f/R12 | 2.98 | T56/(ΣAT − T56) | 0.80 |
| \|f/R14\| | 0.97 | TL/(EPD + T56) | 1.38 |
| (R13 − R14)/(R13 + R14) | −0.20 | EPD/(ΣCT − CT1) | 2.19 |
| f/f2 | −1.36 | (f × TL)/(EPD × ImgH) | 4.38 |
| f/f7 | 0.35 | — | — |

Figure 19:
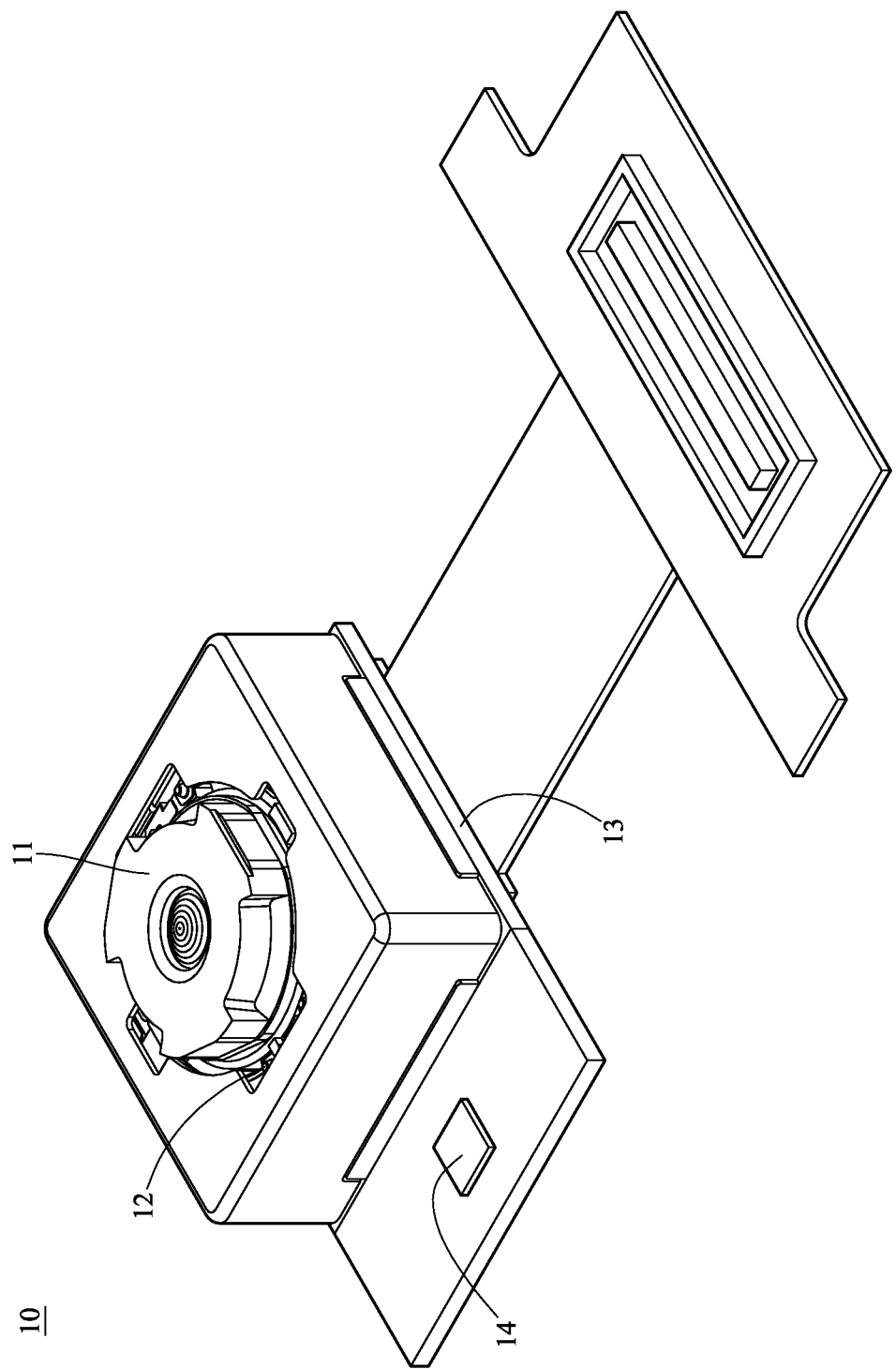
FIG. 19 is a perspective view of an image capturing unit according to the 10th embodiment of the present disclosure.

FIG. 19 is a perspective view of an image capturing unit according to the 10th embodiment of the present disclosure. In this embodiment, an image capturing unit 10 is a camera module including a lens unit 11, a driving device 12, an image sensor 13 and an image stabilizer 14. The lens unit 11 includes the optical imaging lens assembly disclosed in the 1st embodiment, a barrel and a holder member (their reference numerals are omitted) for holding the optical imaging lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical imaging lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

11th Embodiment

Figure 20:
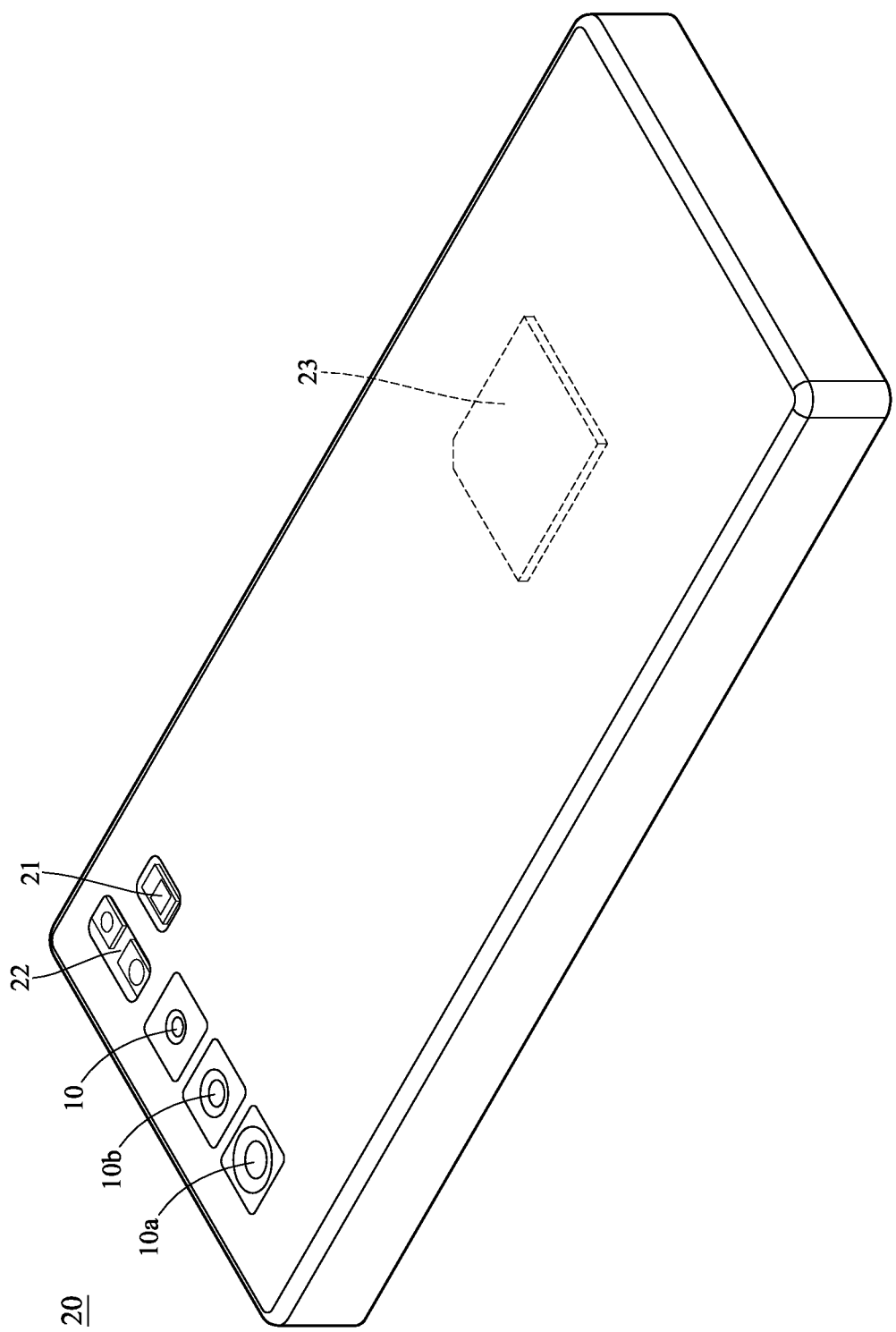
FIG. 20 is one perspective view of an electronic device according to the 11th embodiment of the present disclosure.
Figure 21:
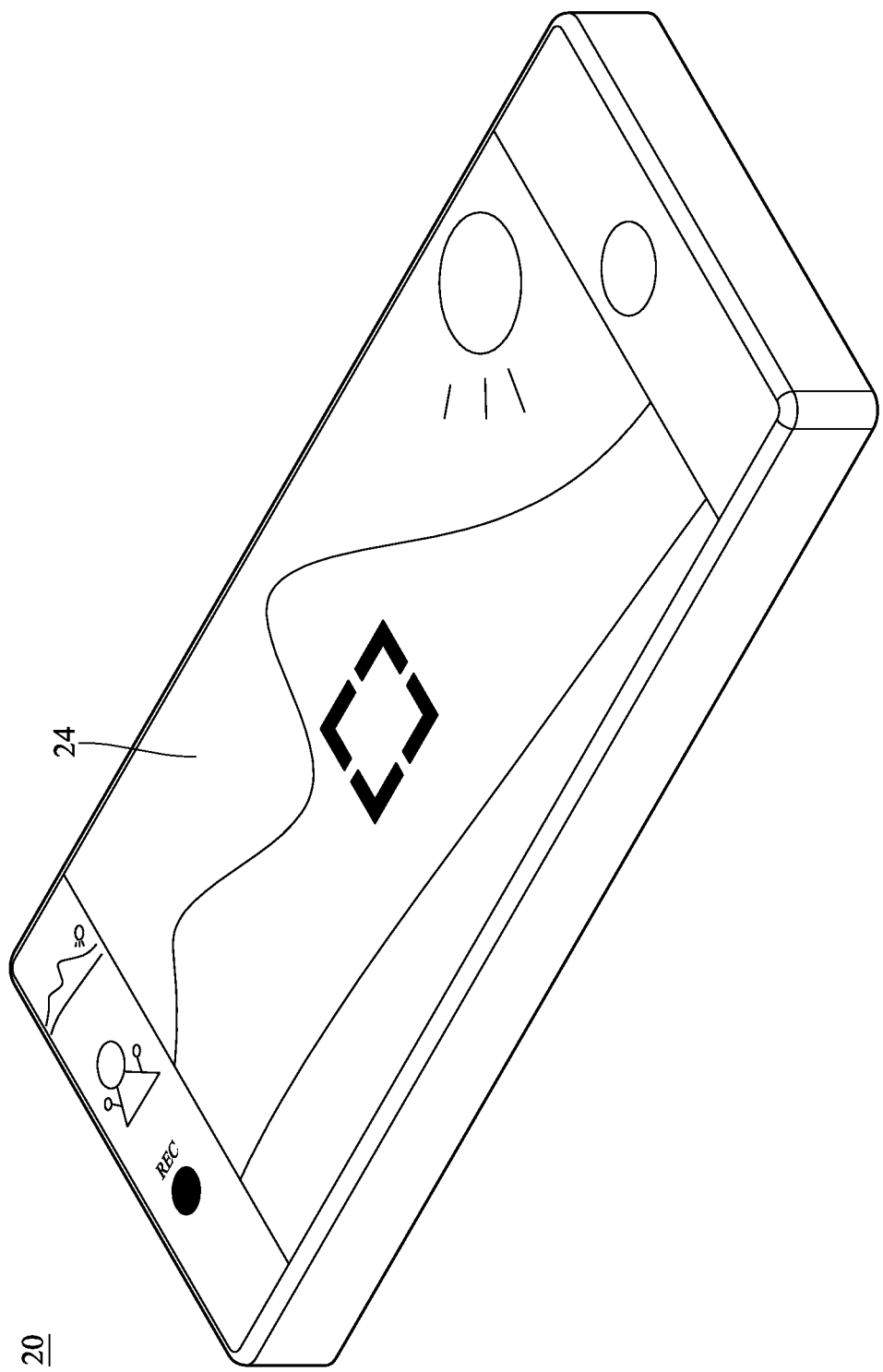
FIG. 21 is another perspective view of the electronic device in FIG. 20.
Figure 22:
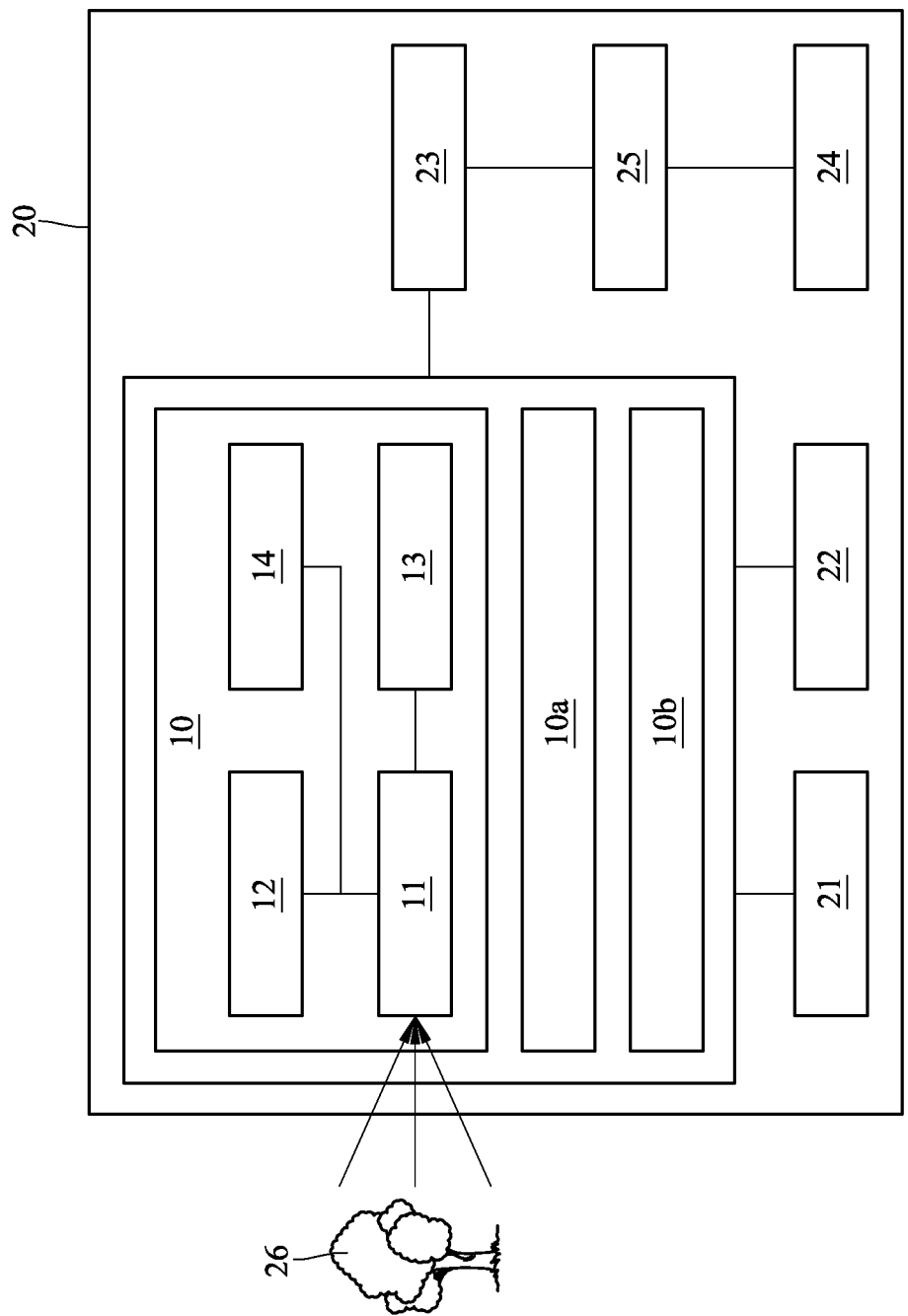
FIG. 22 is a block diagram of the electronic device in FIG. 20.

FIG. 20 is one perspective view of an electronic device according to the 11th embodiment of the present disclosure. FIG. 21 is another perspective view of the electronic device in FIG. 20. FIG. 22 is a block diagram of the electronic device in FIG. 20.

In this embodiment, an electronic device 20 is a smartphone including the image capturing unit 10 disclosed in the 10th embodiment, a flash module 21, a focus assist module 22, an image signal processor 23, a user interface 24, an image software processor 25 and additional two image capturing units 10a and 10b. The image capturing unit 10 features telephoto effect with small field of view. The image capturing unit 10a features wide angle effect with large field of view, and the image capturing unit 10b has a field of view between that of the image capturing unit 10 and that of the image capturing unit 10a. In this embodiment, the electronic device 20 includes multiple image capturing units, but the disclosure is not limited thereto.

When a user captures images of an object 26, the light rays converge in the image capturing unit 10 to generate an image, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical imaging lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side;
wherein the first lens element has positive refractive power, the seventh lens element has negative refractive power, the object-side surface of the seventh lens element is concave in a paraxial region thereof, at least one surface among the object-side surfaces and the image-side surfaces of the seven lens elements has at least one inflection point, each of at least two of the seven lens elements has an Abbe number smaller than 20.0, and an absolute value of a curvature radius of the object-side surface of the seventh lens element is smaller than an absolute value of a curvature radius of the image-side surface of the seventh lens element;

wherein an axial distance between the image-side surface of the seventh lens element and an image surface is BL, an axial distance between the object-side surface of the first lens element and the image-side surface of the seventh lens element is TD, and the following condition is satisfied:

0<BL/TD<0.35.

2. The optical imaging lens assembly of claim 1, wherein the object-side surface of the first lens element is convex in a paraxial region thereof, the image-side surface of the first lens element is concave in a paraxial region thereof, the object-side surface of the second lens element is convex in a paraxial region thereof, and the image-side surface of the second lens element is concave in a paraxial region thereof.

3. The optical imaging lens assembly of claim 1, wherein the second lens element has negative refractive power, and the sixth lens element has positive refractive power.

4. The optical imaging lens assembly of claim 1, wherein the image-side surface of the seventh lens element is convex in a paraxial region thereof.

5. The optical imaging lens assembly of claim 1, wherein the object-side surface of the sixth lens element is convex in a paraxial region thereof, and the image-side surface of the sixth lens element is concave in a paraxial region thereof;
wherein a vertical distance between a critical point on the image-side surface of the sixth lens element and an optical axis is Yc62, a central thickness of the sixth lens element is CT6, and the following condition is satisfied:

0.30<Yc62/CT6<7.50.

6. The optical imaging lens assembly of claim 1, wherein at least one surface of at least one lens element among the fifth lens element, the sixth lens element and the seventh lens element has at least one inflection point;
wherein a focal length of the optical imaging lens assembly is f, a curvature radius of the object-side surface of the first lens element is R1, and the following condition is satisfied:

2.20<f/R1≤3.30.

7. The optical imaging lens assembly of claim 1, wherein the axial distance between the image-side surface of the seventh lens element and the image surface is BL, the axial distance between the object-side surface of the first lens element and the image-side surface of the seventh lens element is TD, and the following condition is satisfied:

0.05<BL/TD<0.20.

8. The optical imaging lens assembly of claim 1, wherein the curvature radius of the object-side surface of the seventh lens element is R13, the curvature radius of the image-side surface of the seventh lens element is R14, and the following condition is satisfied:

−1.80<(R13−R14)/(R13+R14)<0.50.

9. The optical imaging lens assembly of claim 1, wherein a focal length of the optical imaging lens assembly is f, an axial distance between the object-side surface of the first lens element and the image surface is TL, an entrance pupil diameter of the optical imaging lens assembly is EPD, a maximum image height of the optical imaging lens assembly is ImgH, and the following condition is satisfied:

2.0<(f×TL)/(EPD×ImgH)≤3.74.

10. The optical imaging lens assembly of claim 1, wherein a curvature radius of the object-side surface of the first lens element is R1, a central thickness of the first lens element is CT1, and the following condition is satisfied:

1.32≤R1/CT1<3.50.

11. The optical imaging lens assembly of claim 1, wherein a focal length of the optical imaging lens assembly is f, an entrance pupil diameter of the optical imaging lens assembly is EPD, and the following condition is satisfied:

1.0<f/EPD<2.20.

12. The optical imaging lens assembly of claim 1, wherein an entrance pupil diameter of the optical imaging lens assembly is EPD, a sum of central thicknesses of the seven lens elements of the optical imaging lens assembly is ΣCT, a central thickness of the first lens element is CT1, and the following condition is satisfied:

0.50<EPD/(ΣCT−CT1)≤2.30.

13. The optical imaging lens assembly of claim 1, wherein an axial distance between the sixth lens element and the seventh lens element is T67, a central thickness of the sixth lens element is CT6, and the following condition is satisfied:

0.85<T67/CT6<4.0.

14. The optical imaging lens assembly of claim 1, wherein an axial distance between the sixth lens element and the seventh lens element is T67, a central thickness of the sixth lens element is CT6, and the following condition is satisfied:

0.85<T67/CT6≤2.62.

15. The optical imaging lens assembly of claim 1, wherein a central thickness of the first lens element is CT1, a central thickness of the seventh lens element is CT7, and the following condition is satisfied:

1.70<CT1/CT7≤2.49.

16. The optical imaging lens assembly of claim 1, wherein an Abbe number of the seventh lens element is V7, a focal length of the optical imaging lens assembly is f, a focal length of the second lens element is f2, a focal length of the seventh lens element is f7, and the following conditions are satisfied:

V7<30.0;

−3.0<f/f2<0.35; and

−2.50≤f/f7≤−0.49.

17. The optical imaging lens assembly of claim 1, wherein an axial distance between the sixth lens element and the seventh lens element is larger than the axial distance between the image-side surface of the seventh lens element and the image surface;
wherein a focal length of the optical imaging lens assembly is f, a focal length of the second lens element is f2, and the following condition is satisfied:

−1.14≤f/f2<0.35.

18. The optical imaging lens assembly of claim 1, wherein an axial distance between the sixth lens element and the seventh lens element is maximum among axial distances between every adjacent lens elements of the optical imaging lens assembly;
wherein an axial distance between the object-side surface of the first lens element and the image surface is TL, a focal length of the optical imaging lens assembly is f, and the following condition is satisfied:

0.50<TL/f<1.50.

19. An image capturing unit, comprising:
the optical imaging lens assembly of claim 1; and
an image sensor disposed on the image surface of the optical imaging lens assembly.

20. An electronic device, comprising:
the image capturing unit of claim 19.

* * * * *